(12) United States Patent
Kettner et al.

(10) Patent No.: US 8,620,722 B2
(45) Date of Patent: Dec. 31, 2013

(54) SYSTEM AND METHOD FOR ORGANIZING AN ENTERPRISE

(75) Inventors: Björn Kettner, Saarbrücken (DE); Cornelia Behrendt-Schinke, Saarbrücken (DE); Jörg Haupenthal, St. Wendel (DE)

(73) Assignee: SAP Aktiengesellschaft, Walldorf (DE)

( * ) Notice: Subject to any disclaimer, the term of this patent is extended or adjusted under 35 U.S.C. 154(b) by 1303 days.

(21) Appl. No.: 11/073,038

(22) Filed: Mar. 4, 2005

(65) Prior Publication Data

US 2005/0209900 A1 Sep. 22, 2005

Related U.S. Application Data

(60) Provisional application No. 60/551,221, filed on Mar. 8, 2004, provisional application No. 60/563,284, filed on Apr. 16, 2004.

(51) Int. Cl.
*G06Q 10/00* (2012.01)
(52) U.S. Cl.
USPC .......................................................... 705/7.33
(58) Field of Classification Search
USPC ........................................................ 705/7–10
See application file for complete search history.

(56) References Cited

U.S. PATENT DOCUMENTS

| | | | |
|---|---|---|---|
| 5,400,253 A | 3/1995 | O'Connor | |
| 5,712,995 A | 1/1998 | Cohn | |
| 5,758,327 A | 5/1998 | Gardner et al. | |
| 5,929,854 A | 7/1999 | Ross | |
| 5,930,771 A | 7/1999 | Stapp | |
| 5,970,475 A | 10/1999 | Barnes et al. | |
| 5,999,914 A | 12/1999 | Blinn et al. | |
| 6,029,139 A | 2/2000 | Cunningham et al. | |
| 6,151,608 A | 11/2000 | Abrams | |
| 6,215,490 B1 | 4/2001 | Kaply | |
| 6,507,851 B1 | 1/2003 | Fujiwara et al. | |
| 6,831,666 B1 | 12/2004 | Kreis | |
| 6,868,528 B2 | 3/2005 | Roberts | |
| 6,910,017 B1 | 6/2005 | Woo et al. | |
| 6,915,276 B2* | 7/2005 | Foster et al. | 705/26.1 |
| 6,980,966 B1 | 12/2005 | Sobrado et al. | |
| 7,092,896 B2* | 8/2006 | Delurgio et al. | 705/7.35 |
| 7,092,929 B1* | 8/2006 | Dvorak et al. | 705/28 |

(Continued)

FOREIGN PATENT DOCUMENTS

JP 2004-30343 A 1/2004

OTHER PUBLICATIONS

U.S. Appl. No. 60/374,892, filed Apr. 22, 2002, Krajec.
"Beyond Markdown Management", summer/autumn 03, the 4caster, Issue 4, vol. 2, 4 pages.
"Retailers Manage Markdown Challenges Using i2 Solutions", Jan. 13, 2003, NFR 92nd Annual Convention & Expo, 2 pages.

(Continued)

*Primary Examiner* — Andre Boyce
(74) *Attorney, Agent, or Firm* — Foley & Lardner LLP

(57) ABSTRACT

A system, method and program product are provided for organizing a store into a department store having shops associated therewith. The method includes receiving a designation of at least one store as being a department store. The department stores of the enterprise defining a department store organizational level. A designation of at least one shop having a type and being a member of the department store is received. A shop organizational level is defined by each shop in the enterprise. The shop operates as a component of the associated department store.

18 Claims, 29 Drawing Sheets

(56) References Cited

U.S. PATENT DOCUMENTS

| | | | |
|---|---|---|---|
| 7,117,165 B1 | 10/2006 | Adams et al. | |
| 7,117,451 B2 | 10/2006 | Sielken | |
| 7,117,452 B1 | 10/2006 | Pavelski et al. | |
| 7,124,373 B1 | 10/2006 | Patil | |
| 7,139,731 B1 | 11/2006 | Alvin | |
| 7,788,595 B2 | 8/2010 | Biwer et al. | |
| 7,813,961 B2 | 10/2010 | Wittmer et al. | |
| 8,050,985 B2* | 11/2011 | Zieger et al. | 705/28 |
| 2001/0034559 A1 | 10/2001 | Brown et al. | |
| 2001/0039517 A1* | 11/2001 | Kawakatsu | 705/26 |
| 2002/0023500 A1 | 2/2002 | Chikuan et al. | |
| 2002/0026368 A1 | 2/2002 | Carter | |
| 2002/0054141 A1 | 5/2002 | Yen et al. | |
| 2002/0059108 A1 | 5/2002 | Okura et al. | |
| 2002/0078159 A1 | 6/2002 | Petrogiannis et al. | |
| 2002/0107713 A1 | 8/2002 | Hawkins | |
| 2002/0122066 A1 | 9/2002 | Bates et al. | |
| 2002/0123930 A1 | 9/2002 | Boyd et al. | |
| 2002/0147668 A1 | 10/2002 | Smith et al. | |
| 2002/0184116 A1 | 12/2002 | Tam et al. | |
| 2003/0023500 A1 | 1/2003 | Boies et al. | |
| 2003/0028437 A1 | 2/2003 | Grant et al. | |
| 2003/0046120 A1 | 3/2003 | Hoffman et al. | |
| 2003/0046195 A1 | 3/2003 | Mao | |
| 2003/0069782 A1* | 4/2003 | Chrisman et al. | 705/10 |
| 2003/0117440 A1 | 6/2003 | Hellyar et al. | |
| 2003/0126024 A1* | 7/2003 | Crampton et al. | 705/22 |
| 2003/0158791 A1 | 8/2003 | Gilberto et al. | |
| 2003/0172007 A1 | 9/2003 | Helmolt et al. | |
| 2003/0212617 A1 | 11/2003 | Stone et al. | |
| 2003/0229502 A1 | 12/2003 | Woo | |
| 2004/0098358 A1 | 5/2004 | Roediger | |
| 2004/0113934 A1 | 6/2004 | Kleinmann et al. | |
| 2004/0148136 A1 | 7/2004 | Sasaki et al. | |
| 2004/0162763 A1* | 8/2004 | Hoskin et al. | 705/26 |
| 2004/0186783 A1 | 9/2004 | Knight et al. | |
| 2004/0210489 A1* | 10/2004 | Jackson et al. | 705/22 |
| 2004/0220861 A1 | 11/2004 | Morciniec et al. | |
| 2004/0267674 A1 | 12/2004 | Feng et al. | |
| 2005/0055283 A1 | 3/2005 | Zarovinsky | |
| 2005/0060270 A1 | 3/2005 | Ramakrishnan | |
| 2005/0086122 A1 | 4/2005 | Cirulli et al. | |
| 2005/0096963 A1 | 5/2005 | Myr et al. | |
| 2005/0102192 A1 | 5/2005 | Gerrits et al. | |
| 2005/0102227 A1 | 5/2005 | Solonchev | |
| 2005/0165659 A1 | 7/2005 | Gruber | |
| 2005/0261954 A1 | 11/2005 | Aoyama et al. | |
| 2006/0020512 A1 | 1/2006 | Lucas et al. | |
| 2006/0036507 A1 | 2/2006 | Pujar et al. | |
| 2006/0112099 A1 | 5/2006 | Musgrove et al. | |
| 2007/0050272 A1 | 3/2007 | Godlewski et al. | |
| 2008/0125906 A1 | 5/2008 | Bates et al. | |

OTHER PUBLICATIONS

Author unknown, "Staffware and Biomni Join Forces to Provide End A1to A1End E A1Procurement Solution with Enhanced Workflow Capability: Self A1Service Functionality will Enable Thousands of Transactions to be Handled Daily from the Desktop," M2 Presswire, Coventry, Feb. 6, 2001, 1 page.

Kelkar et al., Price Modeling in Standards for Electronic Product Catalogs Based on XML, 2002, pp. 366 A1375.

Melcher, "Local tech firm creates retail markdown tool", Mar. 24, 2000, Cincinnati Business Courier, 3 pages.

Profitlogic, available at http://webarchive.org/web/2002060311838/, available at least by Apr. 15, 2005, 22 pages.

Srinivasan et al., Concepts and strategy guidelines for designing value enhancing sales promotions, Journal of Product and Brand Management, vol. 7, No. 5, 1998, pp. 410 A1420.

Subrahmanyan et al., "Developing optimal pricing and inventory policies for retailers who face uncertain demand", Journal of Retailing, vol. 72, No. 1, Spring, 1996, 15 pages.

Abraham et al., "An Implemented System For Improving Promotion Productivity Using Store Scanner Data", Marketing Science, Summer 1993, vol. 12, No. 3, pp. 248-269.

Notice of Allowance for U.S. Appl. No. 11/074,367, mail date Nov. 30, 2009, 12 pages.

Office Action for U.S. Appl. No. 11/028,459, mail date Aug. 10, 2006, 11 pages.

Office Action for U.S. Appl. No. 11/028,459, mail date Jul. 21, 2009, 9 pages.

Office Action for U.S. Appl. No. 11/028,459, mail date May 28, 2008, 11 pages.

Office Action for U.S. Appl. No. 11/028,459, mail date Nov. 12, 2008, 9 pages.

Office Action for U.S. Appl. No. 11/028,459, mail date Oct. 10, 2007, 12 pages.

Office Action for U.S. Appl. No. 11/074,367, mail date Dec. 2, 2008, 11 pages.

Office Action for U.S. Appl. No. 11/074,367, mail date Jun. 23, 2008, 16 pages.

Office Action for U.S. Appl. No. 11/074,367, mail date Jun. 9, 2009, 15 pages.

Office Action for U.S. Appl. No. 11/074,367, mail date Sep. 6, 2007, 11 pages.

Office Action for U.S. Appl. No. 11/028,459, mail date Feb. 18, 2010, 6 pages.

Hughes, G. David, Business Computer Systems, Boston: May 1984. vol. 3, Iss. 5; p. 33, 3 pages. http://proquest.umi.com/pqdweb?did=1912017&sid=10&Fmt=2&clientId=19649&RQT=309&VName=PQD, with the Notice of Allowance in U.S. Appl. No. 11/028,459, 2 pages.

Notice of Allowance on U.S. Appl. No. 11/028,459, mail date Jun. 11, 2010, 7 pages.

* cited by examiner

FIGURE 11

Prototyp: Pflegebild Shops zur Category

Pflege der Shops einer Category

Category

DOB — 354
— 355

Warenhauser vorschlagen

Shops zur Category

| Haus | Warenhaus | Shop | Bezeichnung | VorlS... | Bezeichnung VorlShop | Ex | | |
|------|-----------|------|-------------|----------|----------------------|-----|---|---|
| WH01 | Essen | ESH1 | Essen - Damenobe... | MSH4 | München - Damenoberbek... | ☐ | ✓ | Zusatzdaten |
| WH02 | München | MSH4 | München - Damen... | | | | ☐ | Zusatzdaten |
| WH03 | Saarbrücken | SSH5 | Saarbrücken - Da... | | | | ☐ | Zusatzdaten |
| | | | | | | | ☐ | Zusatzdaten |
| | | | | | | | ☐ | Zusatzdaten |
| | | | | | | | ☐ | Zusatzdaten |
| | | | | | | | ☐ | Zusatzdaten |
| | | | | | | | ☐ | Zusatzdaten |

| My F4 Help | Description | Hierarchy | Category |
|---|---|---|---|
| ▷ 🗀 Department Stores | | | |
| △ 🗋 D009 | Berlin-Kurfürstendamm | | |
| △ 🗋 D025 | Frankfurt | | |
| △ 🗋 D122 | Duisburg | | |
| ▷ 🗁 DS01 | Department Store 01 | | |
| △ 🗋 A0BF | Store 01 | 20 | 400000 |
| △ 🗋 A0BG | Store Best Ager | 20 | 400001 |
| △ 🗋 A0BH | Store Dessous/Lingerie | 20 | 400002 |
| △ 🗋 A0BI | Store Home Wear | 20 | 400004 |
| △ 🗋 A0BJ | Store foundation gar... | 20 | 400003 |
| △ 🗋 A0BK | Store Young Fashion | 20 | 400005 |
| △ 🗋 ST01 | Store 01 | | |
| ▷ 🗋 ST17 | test | K1 | 840100 |
| △ 🗋 DS02 | Department Store 02 | | |
| △ 🗋 DS03 | Department Store 03 | | |
| △ 🗋 DS04 | Department Store 04 | | |
| △ 🗋 DS05 | Department Store 05 | | |
| △ 🗋 DS06 | Department Store 06 | | |
| △ 🗋 DS07 | Department Store 07 | | |
| △ 🗋 DS08 | Department Store 08 | | |
| △ 🗋 DS09 | Department Store 09 | | |
| △ 🗋 DS10 | Department Store 10 | | |
| △ 🗋 DS11 | Department Store 11 | | |
| △ 🗋 DS12 | Department Store 12 | | |
| △ 🗋 DS13 | Department Store 13 | | |
| ▷ 🗋 KWH2 | hugo | | |

| Plant | | | |
|---|---|---|---|
| Plnt | Postl Code | City | Name |
| BW03 | | | WH BT 30 |
| BW04 | | | WH BT 40 |
| BW05 | | | WH BT 50 |
| BW06 | | | WH BT 60 |
| BW07 | | | WH BT 70 |
| BW08 | | | WH BT 80 |
| BW09 | | | WH BT 90 |
| D009 | | | Berlin |
| D025 | | | Frankfurt |
| D122 | | | Duisburg |
| DS01 | | | Department Store 01 |
| DS02 | | | Department Store 02 |
| DS03 | | | Department Store 03 |
| DS04 | | | Department Store 04 |
| DS05 | | | Department Store 05 |
| DS06 | | | Department Store 06 |
| DS07 | | | Department Store 07 |
| DS08 | | | Department Store 08 |
| DS09 | | | Department Store 09 |
| DS10 | | | Department Store 10 |
| DS11 | | | Department Store 11 |
| DS12 | | | Department Store 12 |
| DS13 | | | Department Store 13 |
| HS02 | 84372 | München | Schloss |
| HW01 | 20265 | Hamburg | Warenhaus Hamburg 1 |
| KWH1 | | | Hafen |
| KWH2 | | | hugo |
| MFE1 | | | WH MFE1 |
| QS01 | | | WH QS |
| RKU1 | | Berlin | Warenhaus RKU1 |
| SHA1 | 66111 | Saarbrücken | Test |
| SHA2 | | | WH München |
| SHA9 | | | WH Hamburg |

FIGURE 17B

Create Shops for a Department Store

Select Reference Shops — 458

Dept St. [DS01] — 461  Department Store 01 — 462  Hierarchy [20] — 464  Default Opening Date [ ] — 460, 459

| Shop | Shop Name | Cat. | Cat. Name | Ref... | Ref. Shop Name | Opening d... | Loc.no. 1 | Loc.no. 2 | C | Room No. | Floor |
|------|-----------|------|-----------|--------|----------------|--------------|-----------|-----------|---|----------|-------|
| A0BF | Store 01  | 400000 | Beach |  |  |  | 0000000 | 00000 | 0 |  |  |
| ST01 | Store 01  |  |  |  |  |  | 0000000 | 00000 | 0 |  |  |
| ST17 | test      | 040100 |  |  |  |  | 0000000 | 00000 | 0 |  |  |
| A0BG | Store Best Ager | 400001 | Best Ager | A0BF | Store 01 | 01.12.2004 | 4545445 | 45455 | 5 | 2 | 2 |
| A0BH | Store Dessous/Lingerie | 400002 | Dessous/Lin... | A0BF | Store 01 | 01.12.2004 | 4664554 | 45454 | 6 | 3 | 3 |
| A0BI | Store Home Wear | 400004 | Home wear | A0BF | Store 01 | 01.12.2004 | 1212121 | 12121 | 2 | 3 | 23 |
| A0BJ | Store foundation garements | 400003 | Foundation g... |  |  | 01.12.2004 | 5555555 | 44545 | 2 | 3 | 23 |
| A0BK | Store young fashion | 400005 | Young fashion |  |  |  | 0000000 | 44444 | 1 | 3 | 23 |

463 — 465 — 466 — 467 — 468 — 470 — 455

Set Up Shop Data — 457   Det. Maint — 456

Figure 21:
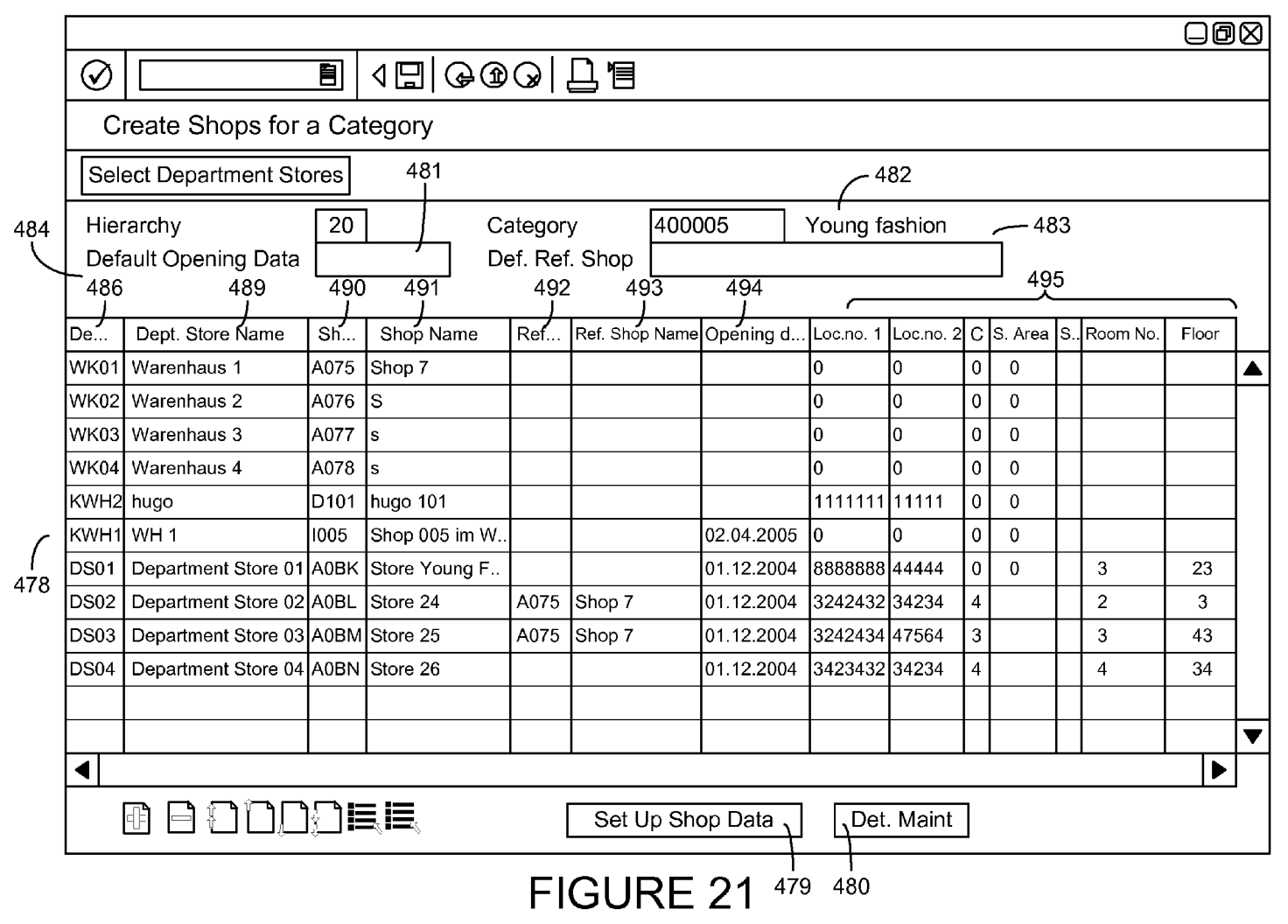

Create Shops for a Category

Select Department Stores

Hierarchy: 20 — 490, 491
Default Opening Data — 489

Category: 400005 — 481
Def. Ref. Shop — 492, 493   Young fashion — 482, 483
— 494                                        — 495

| De... | Dept. Store Name | Sh... | Shop Name | Ref... | Ref. Shop Name | Opening d... | Loc.no. 1 | Loc.no. 2 | C | S. Area | S. Room No. | Floor |
|---|---|---|---|---|---|---|---|---|---|---|---|---|
| WK01 | Warenhaus 1 | A075 | Shop 7 | | | | | 0 | 0 | 0 | | |
| WK02 | Warenhaus 2 | A076 | S | | | | | 0 | 0 | 0 | | |
| WK03 | Warenhaus 3 | A077 | s | | | | | 0 | 0 | 0 | | |
| WK04 | Warenhaus 4 | A078 | | | | | 1111111 | 11111 | 0 | 0 | | |
| KWH2 | hugo | D101 | hugo 101 | | | | 0 | 0 | 0 | | | |
| KWH1 | WH 1 | I005 | Shop 005 im W... | | | 02.04.2005 | | | | | | |
| DS01 | Department Store 01 | A0BK | Store Young F... | A075 | Shop 7 | 01.12.2004 | 8888888 | 44444 | 0 | 4 | 3 | 23 |
| DS02 | Department Store 02 | A0BL | Store 24 | A075 | Shop 7 | 01.12.2004 | 3242432 | 34234 | 4 | 3 | 2 | 3 |
| DS03 | Department Store 03 | A0BM | Store 25 | | | 01.12.2004 | 3242434 | 47564 | 3 | 3 | 3 | 43 |
| DS04 | Department Store 04 | A0BN | Store 26 | | | 01.12.2004 | 3423432 | 34234 | 4 | 4 | 4 | 34 |

Set Up Shop Data — 479   Det. Maint — 480

SYSTEM AND METHOD FOR ORGANIZING AN ENTERPRISE

CROSS-REFERENCE TO RELATED PATENT APPLICATIONS

This application claims the benefit of U.S. Provisional Application No. 60/551,221, filed Mar. 8, 2004 and entitled "Inventory Management," and U.S. Provisional Application No. 60/563,284, filed Apr. 16, 2004 and entitled "Inventory Management," both of which are hereby incorporated by reference.

FIELD OF THE INVENTION

The present invention relates generally to the field of merchandise sales, and more specifically to the use of systems and methods for organizing a store.

BACKGROUND OF THE INVENTION

In general, business models can involve buying merchandise and services for one price and selling it for another. In the process, sellers can incur spectacular costs marketing to prospective and existing users, leasing stores, paying employees, buying and maintaining information technology, transporting, and, most importantly, buying and managing the merchandise itself.

Planning, at one level, is a strategic activity. Executives set business objectives and merchandise planners derive strategies to meet them: back to basics to reduce the style count, extended assortments with additional colors and styles, or new lines of business such as health & beauty. On another level, planning is tactical and operational. The plan influences how many styles and colors a merchant will carry. It influences how distributions are planned for stores. It influences when markdowns are expected to be taken for each style and color. It also influences which stores should carry each style.

However, stores are currently limited by their organizational structure. The large numbers of goods sold by stores in terms of both depth and breadth creates a challenge for an enterprise trying to efficiently manage assortment and allocation and to track profitability and trends. Current stores are limited to operating on a store level, that is the smallest organizational unit by which an enterprise operates is a store. In addition, stores are normally defined by a physical location rather than based on organizational logic.

In view of the foregoing, it would be beneficial to provide a method and system that provides efficient and useful structure for a store. Moreover, it would be beneficial to provide a method and system that allows for detailed control over assortment and planning of merchandise within a store.

SUMMARY OF THE INVENTION

The present invention relates to systems and methods for organizing a store. According to a first embodiment of the present invention, a method is provided for receiving a designation of at least one store as being a department store. A department store level as an organizational unit is defined as consisting of each department store in the enterprise. A designation of at least one shop having a type and being a member of the department store is received. A shop level as an organizational unit is established as consisting of each shop in the enterprise According to another embodiment, a system is provided for organizing a shop within a department store structure for an enterprise. The system comprises a plurality of stores. At least one of the plurality of stores is designated as a department store. At least one shop is assigned to the department store as a subunit According to yet another embodiment, a program product for organizing a store in an operative execution system comprises machine-readable program code. The program code, when executed, causes one or more machines to perform method steps. The method steps include providing for receiving a designation of at least one store as being a department store. A department store level as an organizational unit is defined as consisting of each department store in the enterprise. A designation of at least one shop having a type and being a member of the department store is received. A shop level as an organizational unit is established as consisting of each shop in the enterprise Other features and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

FIG. 11 shows a maintenance screen for shops for a category.

FIG. 16B depicts the search results of a search shown in FIG. 16A.

FIG. 17A depicts an additional tab page in the search display.

FIG. 17B depicts the search results of a search shown in FIG. 17A.

FIG. 19A shows a screen for selecting a reference shop in the generation of a new shop.

FIG. 19B depicts the status of the screen of 19A after the new shop has been saved.

FIG. 21 shows a screen providing a listing of department stores to associate the shop with.

FIG. 22C illustrates the shop maintenance screen of FIG. 22A with the contact information shown.

FIG. 25 illustrates a calendar call availability schedule for a contact person.

DETAILED DESCRIPTION OF THE EXEMPLARY EMBODIMENTS

Figure 1:
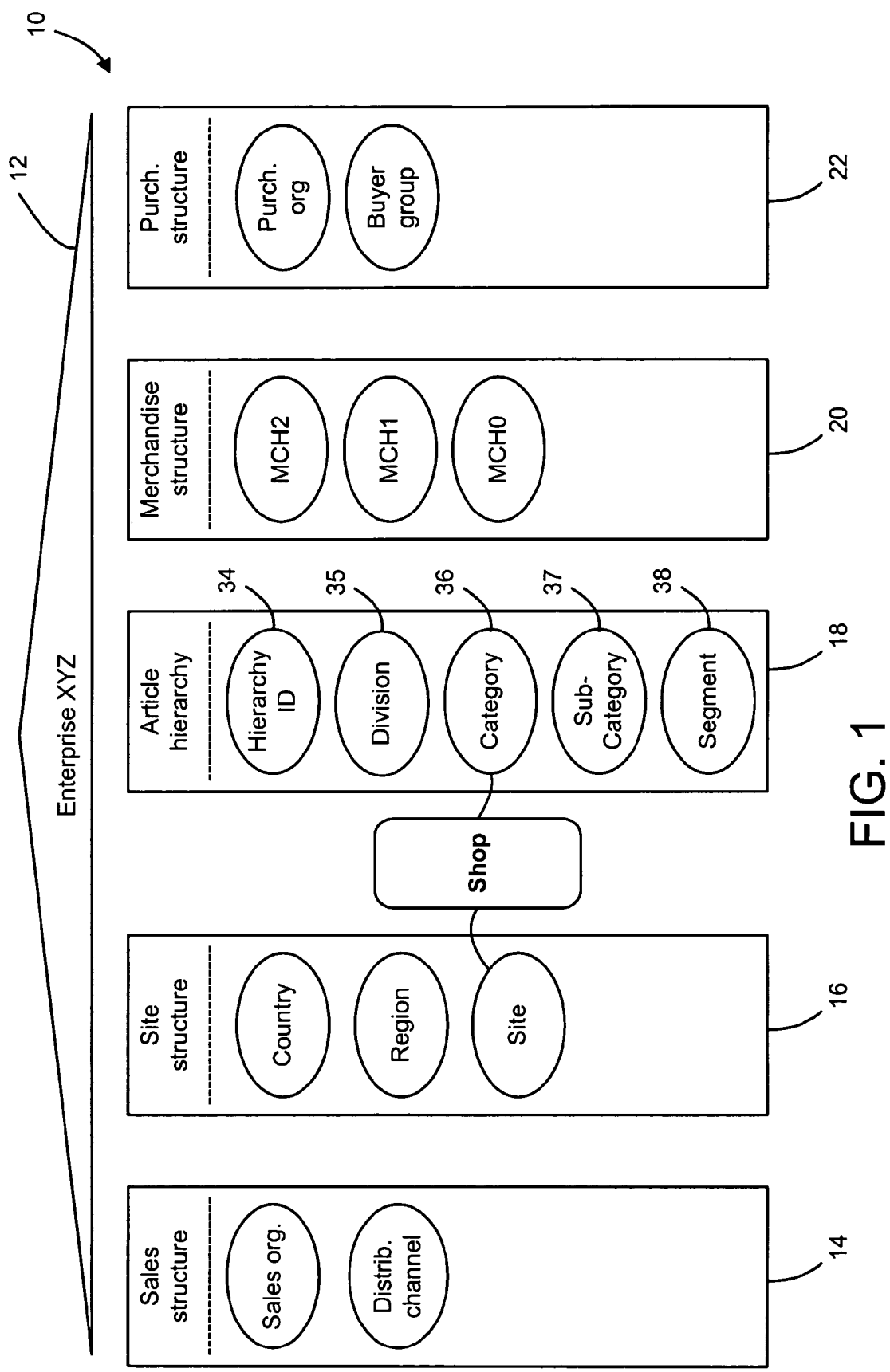
FIG. 1 is a diagrammatic representation of an exemplary enterprise structure for a large retail company.

FIG. 1 illustrates a general overview of an enterprise structure 10 for a company or enterprise 12 (e.g., "Enterprise XYZ") having five segments (or data structures): a sales structure 14, a site or store structure 16, an article hierarchy (or theme structure) 18, a merchandise hierarchy 20, and a purchasing structure 22. Enterprise 12 may be any type of company that regularly needs to perform merchandise and assortment definition and planning, such as a large retail company, a service provider, a non-retail supplier of goods, and the like.

Figure 2:
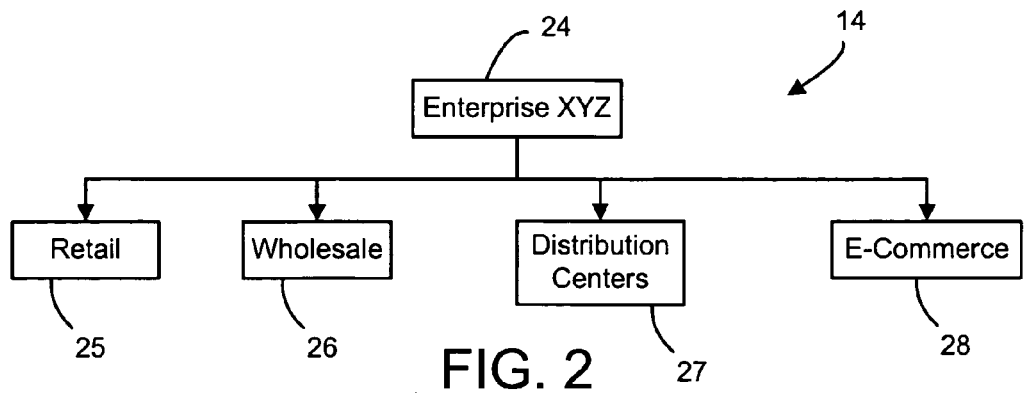
FIG. 2 is a diagrammatic representation of an exemplary sales structure for a large retail company.

Sales structure 14 represents the different sales channels used by enterprise 12. For example, FIG. 2 illustrates one possible arrangement for sales structure 14 as configured for a large retail chain. Sales structure 14 in this example includes an enterprise level node 24 and four sales channel level nodes. The four sales channel nodes include a retail sales channel 25, a wholesale sales channel 26, a distribution center sales channel 27, and an e-commerce sales channel 28. Sales structure 14 may be customizable by a user to include additional or fewer levels, as well as different names, to better represent the sales channels associated with a particular enterprise.

Figure 3:
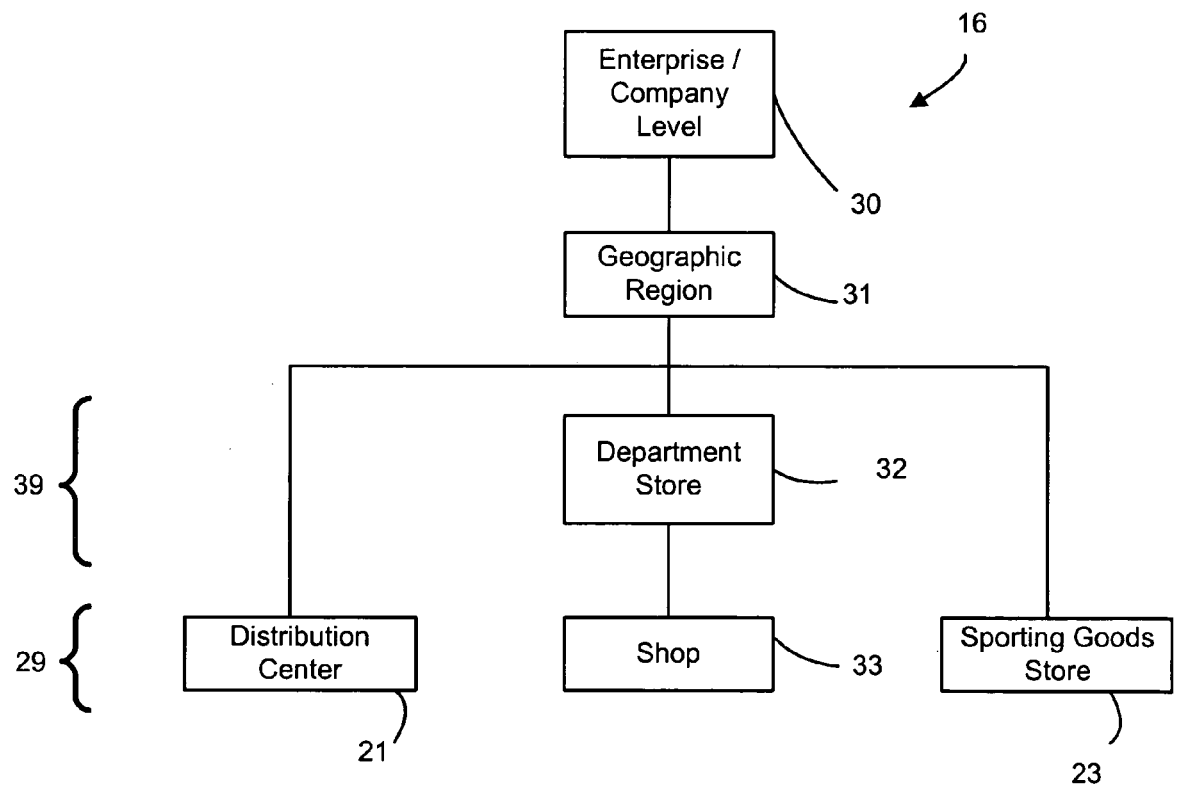
FIG. 3 is a diagrammatic representation of an exemplary site structure for a large department store chain.

Referring again to FIG. 1, site structure 16 represents the local, operative units within which the sale and logistics handling of merchandise (i.e., products or articles) or services takes place. Typical examples of such sites include standalone stores as well as department stores, which unify collections of shops or departments representing various consumer themes (e.g., merchandise categories presented to consumers in unified manner, individual shops in department stores, etc.). FIG. 3 illustrates one possible arrangement for site structure 16 as configured for a large department store chain. As illustrated in FIG. 3, exemplary site structure for a large department store chain consists of an enterprise or company level 30 at a highest point of organization. The enterprise level 30 is further divided into geographic regions 31. The geographic regions are then divided into various stores 32, 23 or distribution centers 21. At a reporting level 39, the organizational unit may be a department store 32. The department store 39 consists of shops 31 which are at the operating level 29. In an exemplary embodiment, the distribution center 21 may be used as an organizational unit at the operational level 29. In addition, one embodiment of the present invention includes traditional store organization wherein a store is used as the organizational unit at the operational level 29, such as sporting goods store 23.

In an exemplary embodiment, the enterprise has stores organized into a reporting level and an operating level. At the reporting level, the organization is referred to as a department store. At the operating level, the organization may be a shop, a distribution center, or a store. In one embodiment, organizations at the operating level also support reporting.

Figure 10:
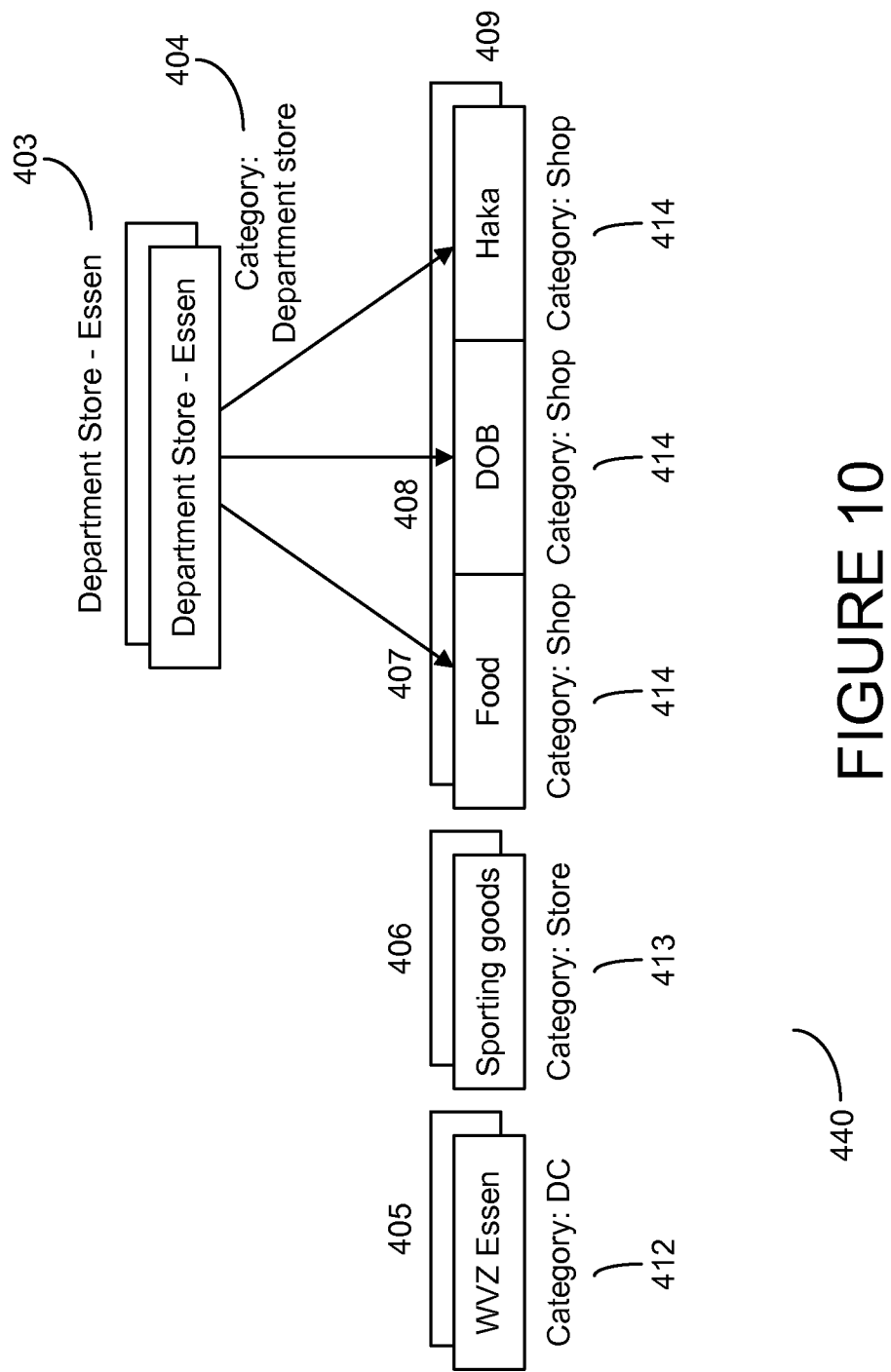
FIG. 10 shows a maintenance screen for shops for a department store.
Figure 12:
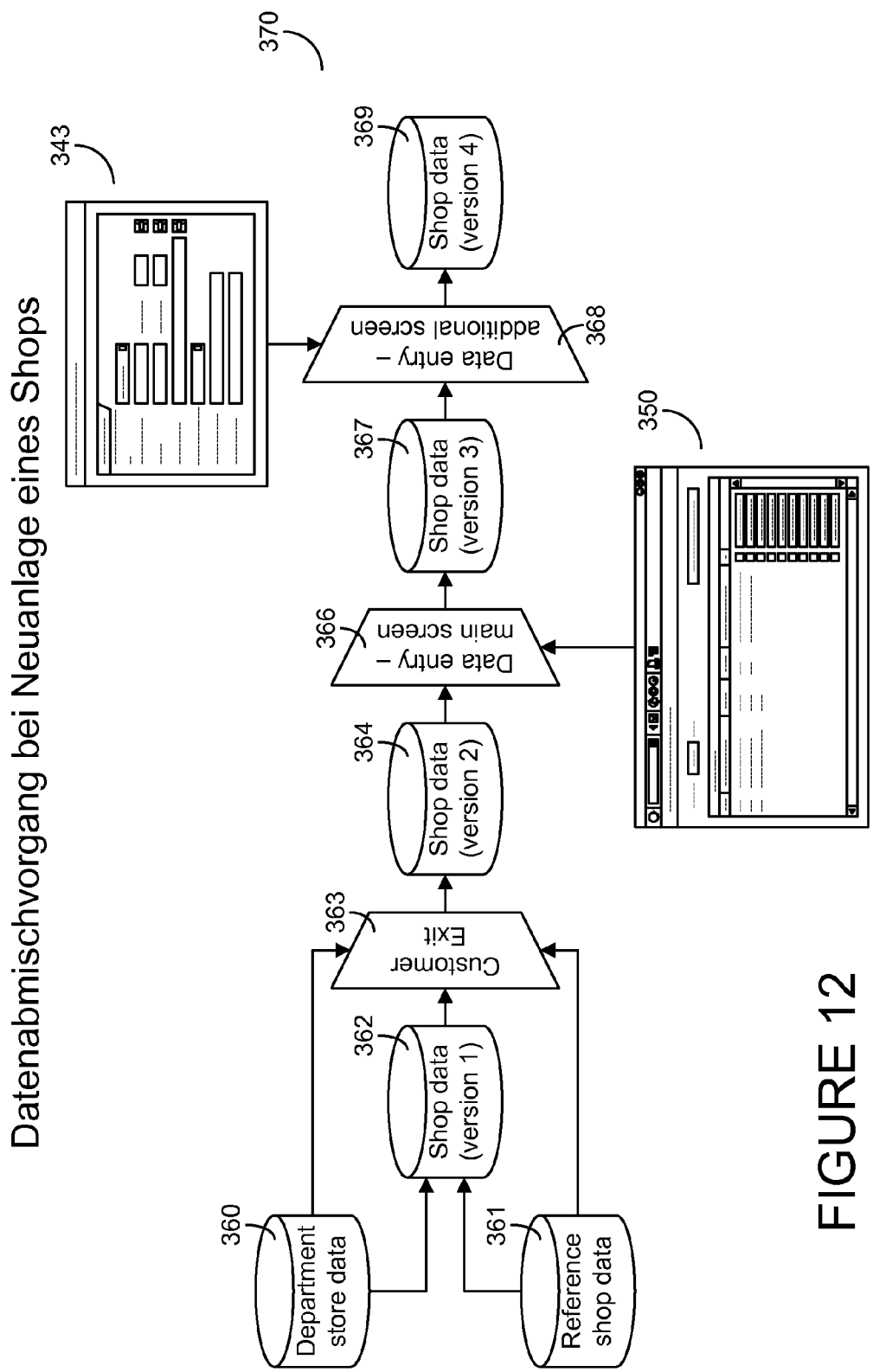
FIG. 12 shows one embodiment of a data merging process to create a new shop.

Shops are operational divisions of a department store. A shop is generally assigned merchandise areas, for which it performs the related retail processes (requirements planning, inventory management, sales, planning). Shops are modeled as stores with an additional indicator. Like conventional stores, shops possess the following properties:

Separate, independent profitability analysis
Inventory managing level
Can be planned
Can be evaluated
Central object in all retail processes The major difference between a shop model and a conventional store model is that the shop model divides the overall assortment into different shops, and each shop can only execute the retail processes for its specific sub-assortment. The individual shops are consolidated organizationally to form a department store. The present invention allows for the use of shops as the independent, inventory management unit within a department store. In an exemplary embodiment, the shops are fully independent of one another, and have their own profitability analysis in addition to physical inventory and inventory management. All standard processes will be implemented at the shop level in addition to the store level. The department store and shop are similar to the stores of the prior art, with the addition of an designator to indicate their status as a shop or a department store (and thus the corresponding functionality) and in addition the shop has an identifier to indicate to which department store it belongs. As shown in FIG. 10, an department store 403 operates on one level and is in the department store category 404 while the corresponding shops 407, 408, and 409 are placed in the shop category 414. In addition, a store 406 and a distribution center 405 of the enterprise 402 are assigned at the same level of operation as the shops 407, 408, and 409 and have a categories store 413 and distribution center 412 respectively.

The department store is an organizational unit in a retail company that unifies individual consumer product ranges. In one exemplary embodiment, a department store an organizational unit representing products sold under one roof. In one embodiment, department stores are modeled as stores with an additional indicator. In contrast to conventional stores, a department store does not have an inventory-managing character for consumer merchandise, because inventory management on an article or value basis takes place at the shop (operating) level. However, the department store can represent an overreaching inventory management level for consumable materials, advertising materials, and additional items for use at the department store level. In one embodiment, the department store groups shops at a physical address. In an alternative embodiment, different shops can also exist at separate locations and merely be assigned logically to a department store. An enterprise may, in one embodiment, utilize both physical and logical groupings of shops into department stores. There is no inheritance of changes from department store level to shop level. Because each shop uses its own control parameters, and other requirements may also apply depending on the shop assortment, the department store can only serve as a general reference for creating new shops.

In accordance with the principles of the present invention, when a store is required to manage existing departments (for example, departments within a retail store) as independent operating units, the departments can be modeled as shops and the "store" site can be modeled as a department store. In this construct, the department store is the organizational capsule around the individual shops. The operative processes generally run at the shop unit (i.e. operational level). From an operative standpoint, the department store-shop relationship only plays a minor role—for example, the department store can be used as an aggregation level for reports, or as an easy way to form store groups. In one embodiment, the department store is used in search help functions.

The site master data for department stores and shops is maintained using the standard maintenance functions for sites. The assignment of a shop to the corresponding department store is also maintained in the site master for shops. Linking a shop and a department store makes it possible to copy the data maintained at department store level to the corresponding shop, reducing the effort required to maintain data at shop level to a minimum. This is important because the department store concept can increase the number of sites in the system exponentially. If the department store concept were not applied, for example, and a chain had 200 retail sites/stores, and modeled these sites as department stores that each had an average of 200 shops, this would result in a total of 40,000 sites.

Because the master data would have to be maintained for each of these sites, a maintenance function for department store shops is needed that only requires users to enter the shop-specific master data for each individual job. All other data is filled automatically based on the underlying department store; a reference shop can also be used as a copy template.

In contrast to conventional stores, department stores typically do not have inventory-managing character for consumer merchandise, because inventory management on an article or value basis usually takes place at the shop level. Nonetheless, the department store can represent an overreaching inventory management level for consumable materials, advertising materials, and additionals. Although the department store conventionally groups shops at a physical address, this is not a requirement. For example, different shops can exist at separate physical locations and still be assigned logically to the same department store. Unless otherwise specified below, the term "store" may refer to a conventional store, a department store, or any of the individual shops or departments unified by a department store.

Referring again to FIG. 1, article hierarchy 18 represents a hierarchy of articles down to the segment level. As will become clear below, article hierarchy 18 represents one of many possible ways to hierarchically organize and view articles and make assortment decisions. In FIG. 1, article hierarchy 18 is illustrated with a hierarchy ID level (e.g., a number) 34, a division level 35, a category level 36, a subcategory level 37, and a segment level 38. Article hierarchy 18 may be customized by a user to include additional levels (e.g., a subsegment level below segment level 38) or fewer levels, as well as different names, to better represent the merchandise (e.g., products or articles) layout associated with a particular enterprise. According to an exemplary embodiment, theme structures may be defined with up to 10 levels.

Although the names and number of levels in article hierarchy 18 can be customized, one level in article hierarchy 18 must be defined as the "category" level. The category level may be selected to represent the independent presentation spaces in a store that are devoted to merchandise categories presented to consumers in a unified manner. In the department store context, for example, the category level in article hierarchy 18 may be selected to represent differentiated groupings of shops in the department stores such as confectionaries, menswear departments, and ladies wear departments. Alternatively, a lower level in article hierarchy 18 may be selected to represent the different independent presentation spaces for subgroups of merchandise (e.g., long-arm blouses, short-arm blouses, trousers) within each shop in a department store. Other criteria for selecting the category level may also be used.

In an exemplary embodiment, the level in article hierarchy 18 selected to be the category level has several additional properties that are unique to that level. One unique property of the category level is that stores can be assigned only to that level. In FIG. 1, for example, the assignment of shops in site structure 16 to nodes in category level 36 of article hierarchy 18 shows that category level 36 has been defined as the category level. These assignments make sense primarily in the context of department stores, wherein the stores that are assigned to a category are the shops in different department stores which (primarily) present goods from this category. For example, in most department stores there is a section for "men's fashion." Hence, a category may be defined in the system for "men's fashion," and this section in the department store may be treated as a shop in the system. Thus, at the shop level, a node from the article hierarchy is assigned to the shop.

Another unique property of the category level in article hierarchy 18 is that the assignment of articles (as described in detail below) to hierarchy 18 must be unique below the category level. That is, each article can be assigned only once to a node at or below a particular category node. By contrast, the same article can be assigned again to a different node at or above the category level (e.g., the division level).

Figure 4:
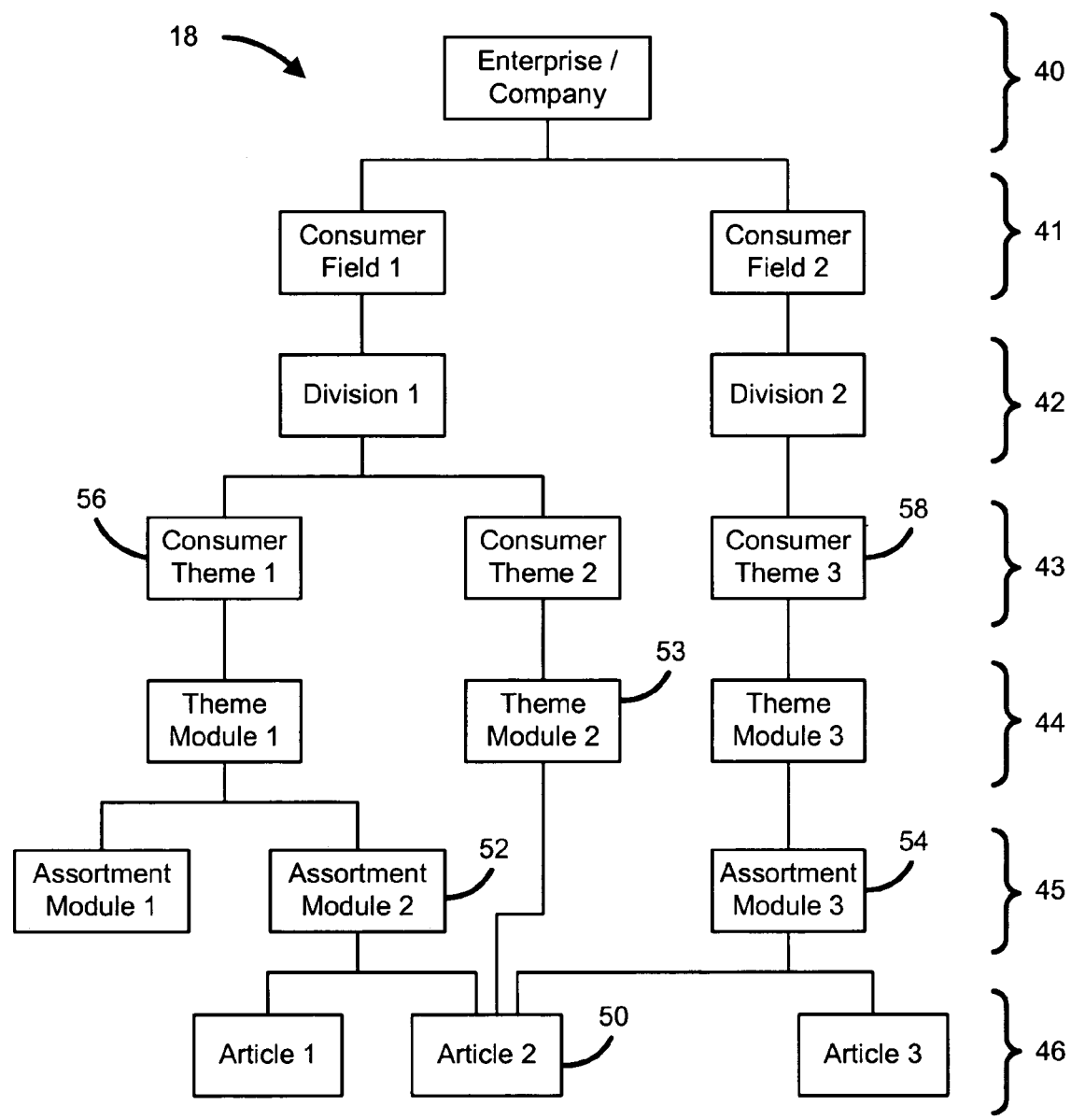
FIG. 4 is a diagrammatic representation of an exemplary article hierarchy for a large retail company.

Reference is now made to FIG. 4 to further illustrate how article hierarchy 18 may be used by an enterprise to better represent merchandise based on, for example, the arrangement of articles and products for displayed in the stores and shops. In this example, article hierarchy 18 has been defined to include seven distinct levels, comprising: an enterprise level 40, a consumer field (CF) level 41, a division level 42, a consumer theme (CT) level 43, a theme module (TM) level 44, an assortment module (AM) level 45, and an article level 46. CF level 41 may be selected to represent different high level groupings of merchandise (e.g., fashion, sport). CT level 43 may be selected to represent merchandise categories presented to consumers in unified manner, such as the individual shops in a department store. TM level 44 may be selected to represent the different independent presentation spaces for subgroups of merchandise (e.g., long-arm blouses, short-arm blouses, trousers) within each shop in a department store. AM level 45 may be selected to group articles according to various criteria such as the time periods during which such articles will be displayed, the stores to which they will be assigned, etc.

According to an exemplary embodiment, the relationships between the various nodes in article hierarchy 18 may be as follows. The relationship between the nodes of each level above AM level 45 and the node(s) in the next lower level may be 1:n. That is, each node in TM level 44 may be assigned or linked to one or more child nodes in AM level 45, while each node in AM level 45 is linked to exactly one parent node in TM level 44. In contrast to the nodes above AM level 45, the relationships between the nodes in AM level 45 and the nodes in article level 46 may be n:m. That is, a single node in AM level 45 may be linked to one or more child nodes in article level 46, while each node in article level 46 may be linked to one or more parent nodes in AM level 45 so long as each parent node in AM level 45 is in a different category. Thus, in the embodiment illustrated in FIG. 4, article node 50 may be linked to both AM node 52 and AM node 54 in AM level 45 because nodes 52 and 54 are assigned to different categories. In particular, AM node 52 is assigned to the category represented by CT node 56 and AM node 54 is assigned to the category represented by CT node 58. In some embodiments, individual articles in article level 46 may be assigned directly to nodes above AM level 45. For example, article node 50 may be linked directly to TM node 53. This assignment is permissible because TM node 53 is assigned to a different category than either CT node 56 or 58. In an exemplary embodiment, the user can set a flag to indicate whether the assignment of individual article nodes to more than one parent node in AM level 45 and/or to other higher level nodes is allowable or prohibited.

After a theme structure has been defined for a company such as described above, one or more business types may be defined for each consumer theme (e.g., each shop in a department store) to further facilitate assortment definition and planning as described below. A business type definition may be a grouping of all stores of a consumer theme, grouped according to criteria level and capacity, using a standardized procedure. Hence, the business type may be defined for every reasonable combination of level type and capacity for a consumer theme. As such, business type definitions can be used to provide strategic grid spacing of stores according to presentation capacity and level, in consultation with division and sales, taking account of location-specific circumstances. The aim of the level type is to describe a CT/store (e.g., a shop in a department store) with regard to the level of the assortment (defined, for example, by price level, brands features, and so on). Thus, the level type of a CT/store is determined based on question such as, in which price categories, with which brands, and which special features is an assortment carried. The capacity type aims to describe a CT/store with regard to its capacity size expressed in, for example, a number of template display racks. Thus, the capacity of a CT/store is determined based on questions such as, how many articles can be carried, with which width and depth.

Returning again to FIG. 1, purchasing structure 22 models the areas of responsibility and authority in purchasing. It consists of several buyer groups below each purchasing organization. According to an exemplary embodiment, each article is assigned to a unique buyer group. The unique assignment of buyer groups to merchandise groups is preferred, but not required.

In accordance with an exemplary embodiment, assortment definition and planning can be performed for various types of merchandise such as fashion merchandise and regular (e.g., stackable, non-fashion, basic, etc.) merchandise. As persons skilled in the art will appreciate, assortment definition and planning for fashion may differ from assortment definition and planning for regular merchandise for various reasons. For example, assortment definition and planning for fashion generally involves: (1) a higher proportion of new articles; (2) shorter life cycles than the assortment planning horizon, and different, reduced possibilities for short-term replenishment; and (3) capacity use is subject to fluctuations within an assortment planning period. Thus, assortment definition and planning for different types of merchandise may be handled differently. In an exemplary embodiment, for example, assortment planning for regular merchandise may be performed at the theme module level and from month-to-month, while assortment planning for fashion may be performed at the consumer theme level and from season-to-season.

In the various embodiments discussed below, assortment definition and planning for an enterprise may be performed using both local assortments and global assortments. When a store or distribution center is first created, an assortment with the same name is also created. This may be referred to as a local assortment. When articles are listed for these local assortments, they can be managed in the respective store in a single step.

Assortments can also be defined which include several stores. These may be referred to as global assortments. Merchandise quantities can be planned for these global assortments, and thus for a group of stores, in the assortment planning processes described below. Articles that are listed for a global assortment can thus be managed for all assigned stores at one time.

Figure 5:
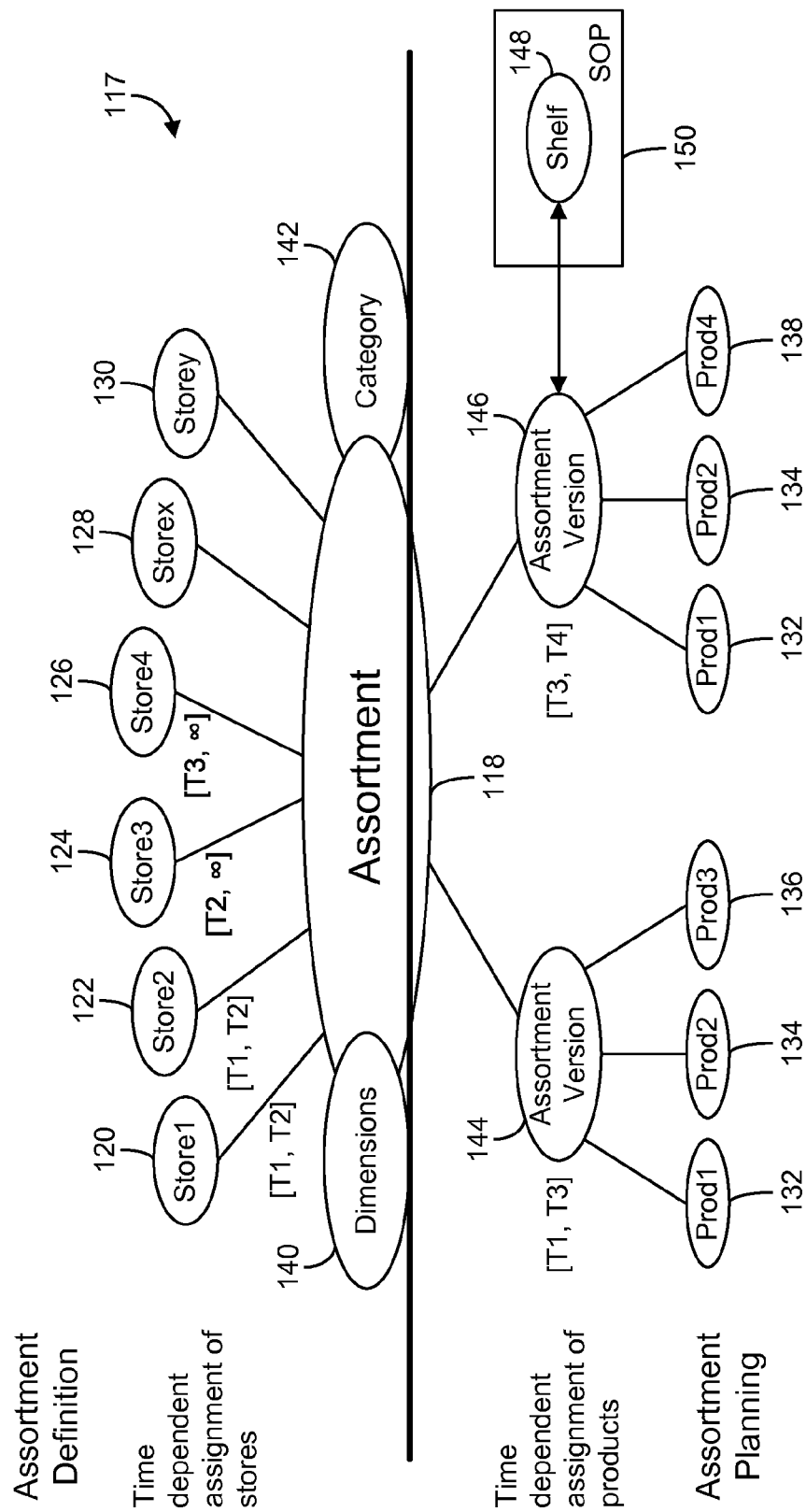
FIG. 5 is a diagrammatic representation of an exemplary global assortment that links together a plurality of stores and a plurality of articles at specific times.

With the foregoing in mind, FIG. 5 illustrates a diagram 117 including a global assortment 118 that links together a plurality of stores 120, 122, 124, 126, 128 and 130 with a plurality of articles 132, 134, 136 and 138. According to an exemplary embodiment, articles are always linked to an assortment (either local or global), rather than directly to retail sites.

Global assortments such as assortment 118 may be classified according to assortment type. Assortment type refers to an assortment attribute that makes it possible to control the strategic direction of the assortment and its handling during assortment design/planning and procurement. In one embodiment, the possible values for the assortment type may be configured by the user. For example, assortments can express the following types: standard assortment—fashion; supplementary assortment—fashion; and regular (e.g., non-fashion) assortment.

In the illustrated embodiment, assortment 118 may also be characterized by one or more assortment dimensions 140. In general, assortment dimensions are attributes of an assortment that can be used during an assortment definition process to group retail sites together to design standardized assortments. That is, the assortment dimensions are used to group together retail sites with similar characteristics to form an assortment that applies to all stores in the group. Retail sites can be grouped differently for different assortment types, i.e., different dimensions can be used as grouping criteria. According to an exemplary embodiment, an assortment can be defined using up to three assortment dimensions. The respective value range or level of the assortment dimensions may be defined and configured by a user. The value range or level of an assortment dimension can be defined differently for each assortment type. By way of example, possible assortment dimensions may include the following retail site characteristics: capacity, price level/grade (high fashion, essential, basic) or sales for a certain group of merchandise, geographical region or location, climactic zone (warm weather, cold weather), demographics (urban, suburban), retail concept, and so on.

With the foregoing in mind, an exemplary assortment may comprise a plurality of retail sites (e.g., store consumer themes or shops in a department store) grouped by category (e.g., consumer theme) with regard to price level/grade and capacity type. Grouping stores by price level and capacity is equivalent to grouping stores by business type as discussed above. In this example, one assortment dimension is the capacity, which may be represented by the following values: "0" to "9" for assortments with type "standard assortment—fashion" and "supplementary assortment—fashion;" and "1" to "6" for assortments with type "regular assortment." The other assortment dimension in this example is the price level/grade, which may be used only for assortment type "standard assortment—fashion" with the four values "1"—high-priced, "2"—mid-priced, "3"—low-priced, and "0" for exceptional cases (e.g., flagship stores and showpieces).

Referring again to the embodiment illustrated in FIG. 5, assortment 118 may also be characterized by a category 142 (e.g., category level 36 in FIG. 1 or consumer theme level 43 in FIG. 4). Alternatively, assortment 118 may be characterized by another level in article hierarchy 18 such as subcategory level 37 or segment level 38 in FIG. 1. In assortments characterized by store category, two of the three assortment dimensions can be classified as, for example, level type and capacity type. Accordingly, a matrix-like definition of the store types can be mapped. By selecting a certain level type, the corresponding capacity types (e.g., extra small, small, medium, large, extra large) can be planned first. The planned quantities can then be copied to assortments with the same capacity type, but an alternate level type.

Referring once again to FIG. 5, articles 132-138 in the illustrated embodiment are not directly assigned to assortment 118. Instead, articles 132-138 are linked to assortment 118 by assortment versions 144 and 146 during assortment planning. In the illustrated embodiment, each assortment version 144, 146 is active or valid for a specified period of time (e.g., valid-from/valid-to dates). For example, articles 132, 134 and 136 are linked to assortment 118 by assortment version 144, which is active between dates/times T1 and T3. Similarly, articles 132, 134 and 138 are linked to assortment 118 by assortment version 146, which is active between dates/times T3 and T4. As persons skilled in the art will recognize, the foregoing time dependencies of the assignments of articles 132-138 to assortment 118 provides for automatic regular (e.g., every month or six weeks) releases of merchandise in the stores to maintain assortment freshness.

According to an exemplary embodiment, each assortment version 144, 146 may represent one or more shelves 148 in each store assigned to assortment 118. Alternatively, each assortment version 144, 146 may represent one or more display racks (which in turn may comprise a plurality of shelves), or one or more layout modules (which in turn may comprise a plurality of display racks). If desired, a space optimization program (SOP) 150 may be used to determine the optimum layout of articles for each assortment version 144, 146.

In the embodiment illustrated in FIG. 5, the assignment of stores 120-130 to assortment 118 during assortment definition also includes time dependencies. For example, stores 120 and 122 may be linked to assortment 118 between dates/times T1 and T2, while stores 124 and 126 may be assigned to assortment 118 starting at dates/times T2 and T3, respectively. In the illustrated embodiment, the assignments of the latter two stores 128 and 130 to assortment 118 is not time dependent, i.e., stores 128 and 130 will remain in assortment 118 until such time as assortment 118 is canceled or changed. The time dependencies of the store assignments may be stored in a data structure that also stores the store assignments.

Figure 6:
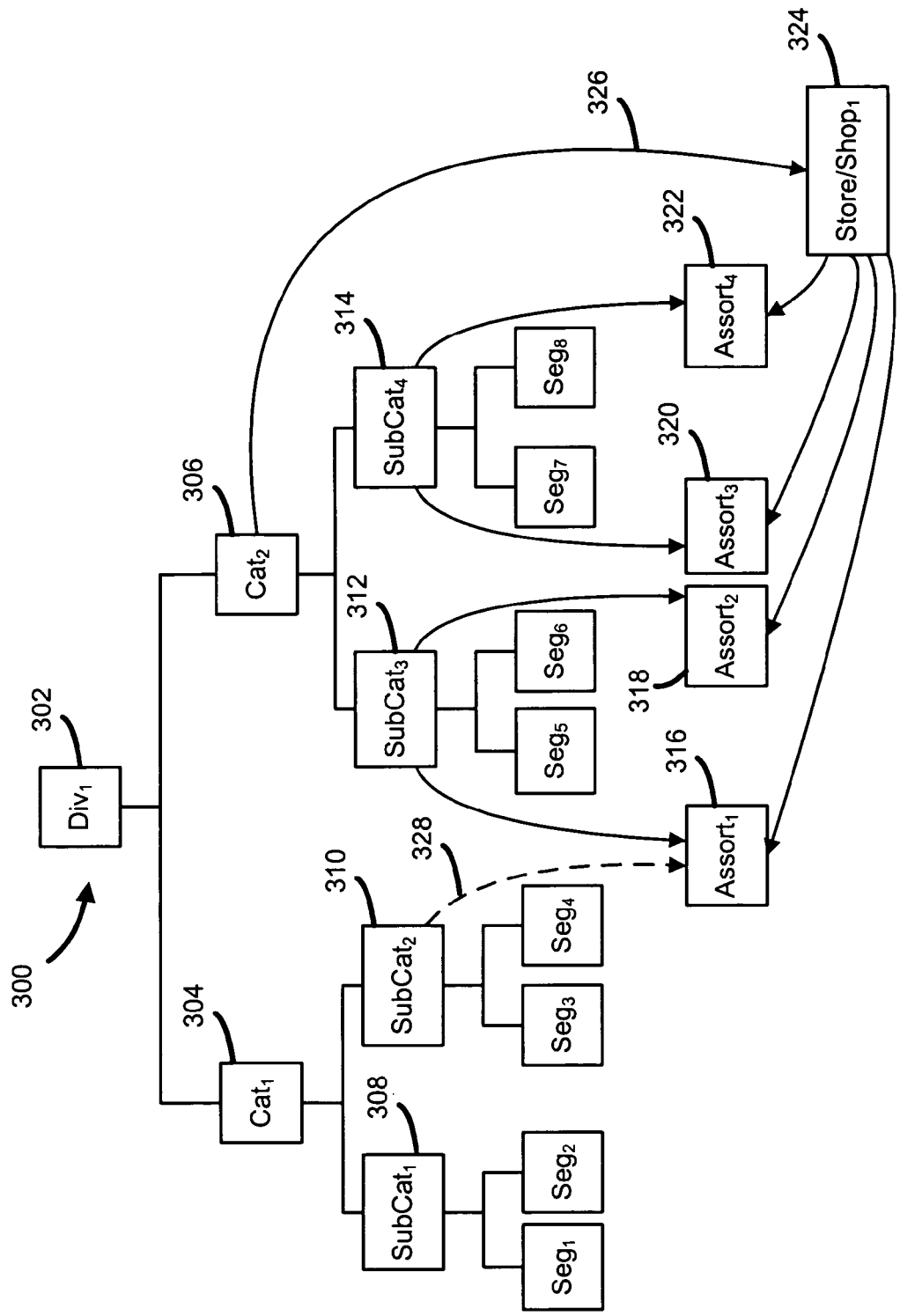
FIG. 6 shows an exemplary view of an article hierarchy having various nodes therein assigned to assortments and another node in the hierarchy assigned to a store as a check on the products that are assignable to the assortment and thus the store.

As indicated in FIG. 5, the assignment of stores to an assortment (i.e., the upper half of diagram 117) may be referred to herein as assortment definition. By contrast, the assignment of articles to an assortment (i.e., the lower half of diagram 152) may be referred to herein as assortment planning. Of course, persons skilled in the art will recognize that different retail merchants may utilize different terms for referring to these two concepts and hence the specific terms of assortment definition and assortment planning should be understood as provided merely for purposes of facilitating explanation of the various With reference now to FIG. 6, an exemplary embodiment of an assortment definition/planning system for restricting the assignment of certain types of products to particular stores is shown and described. In FIG. 6, an article hierarchy 300 is illustrated with a structure such as described above with reference to article hierarchy 18 in FIG. 1. In particular, an uppermost division level node 302 is shown linked to a pair of category level nodes 304 and 306, each of which is shown linked to a pair of subcategory nodes 308, 310, 312, 314. More specifically, category node 304 is shown linked to subcategory nodes 308 and 310, while category node 306 is shown linked to subcategory nodes 312 and 314. In turn, each subcategory node 308, 310, 312 and 314 is shown linked to a number of segment nodes. It will be understood that each segment node may be linked to one or more generic articles or article variants (not shown in FIG. 6). It will also be understood that the particular structure of hierarchy 300 shown in FIG. 6 is merely exemplary and that more or fewer levels could be used, as well as different names for the various levels.

As described above, one or more nodes in hierarchy 300 may be assigned (or linked) to an assortment for purposes of assigning a group of products to that assortment (and thus the stores in that assortment) during assortment planning. For example, subcategory node 312 may be assigned to a pair of assortments 316 and 318 to provide a group assignment of the products under node 312 to assortments 316 and 318. It may be desirable to assign a single node to two assortments, for example, when assortment 316 is for small stores and assortment 318 is for large stores. As another example, subcategory node 314 may be assigned to a pair of assortments 320 (for small stores) and 322 (for large stores) to assign the products under node 314 to assortments 320 and 322. After each of the foregoing assignments of a subcategory node to an assortment is made, one or more products beneath the subcategory node may be excluded (e.g., using a suitable GUI) from the assortment as explained above. Although not illustrated in FIG. 6, nodes above or below the subcategory level could also (or alternatively) be assigned to the assortments.

In addition to the assignments of products to assortments, it is also necessary to assign stores to the assortments so that the desired products are provided to the correct stores at the proper times. Typically, the assignment of the stores to the assortments is performed prior to assigning the products to the assortments using an assortment definition process such as described above in detail. In FIG. 6, a store (or shop) 324 is shown as having already been assigned to assortments 316, 318, 320 and 322.

In an exemplary embodiment, an additional link can be established to create a check or restriction on the types of products that are assignable to a particular store during assortment planning. More specifically, a particular node at one level (e.g., a category level) in an article hierarchy may be assigned to a store to indicate that only products below that node are assignable to that store. In FIG. 6, for example, a link 326 can be established between category node 306 and store node 324 to restrict the types of products that are assignable to store 324 to only those products below node 306. Thus, while the assignment of subcategory 312 to assortment 316 is permissible, the assignment of subcategory 310 to assortment 316 is not permissible (as indicated by a dashed line 328). The assortment planning system may be configured so that any impermissible assignments are completely prevented by the system. Alternatively, the impermissible assignments may simply flagged to users as possible errors in the system but allowed to exist. As yet another possibility, impermissible assignments may be overridden manually, but only when appropriate supervisory approval is given (e.g., by entry of certain passwords).

As persons skilled in the art will recognize, a restriction or check such as described above with reference to FIG. 6 may be particularly beneficial in the context of department stores. For example, if category nodes 304 and 306 represent women's fashion and men's fashion, respectively, and store 324 represents a men's wear shop in a department store, then it may be desirable to establish a link between category node 306 and store 324. When this assignment is made, any attempt to assign women's fashion products to store 324 during assortment planning would be flagged as impermissible.

While the store has been discussed in general with regard to a place for selling merchandise, the present invention relates to the further organization of a store. As mentioned above, opening a new department store with assigned shops is possible in accordance with the principles of the present invention. As shown in FIG. 17, an initial screen may be used to input the department store number, the reference department store, and the plant profile. In one embodiment, when a new retail site is opened, the following master data objects have to be created:

- A store with category "department store", which serves as the organizational capsule for the required shops
- A store with category "shop" for each shop, which allows the merchandise assortment to be divided into independently operating units The creation of shops in a new department store is possible in accordance with the principles of the present invention. New department stores are created using the standard site master maintenance transaction. To do so, a store with category "department store" is created. All relevant master data for the department store is entered in the site master maintenance transaction. Since no articles are sold at the department store level, the amount of master data that has to be maintained is usually less than for a store that executes sales processes. The situation with procurement processes is similar: only articles for the department store's own requirements (such as consumables and additionals) will require procurement processes at the department store level. The articles that are sold in the individual shops will be ordered through the procurement processes of those shops. However, since the master data for the department store can be used as a template for creating the master data of a shop, it may be necessary to enter additional data at the department store level that is not actually used operationally.

Figure 13:
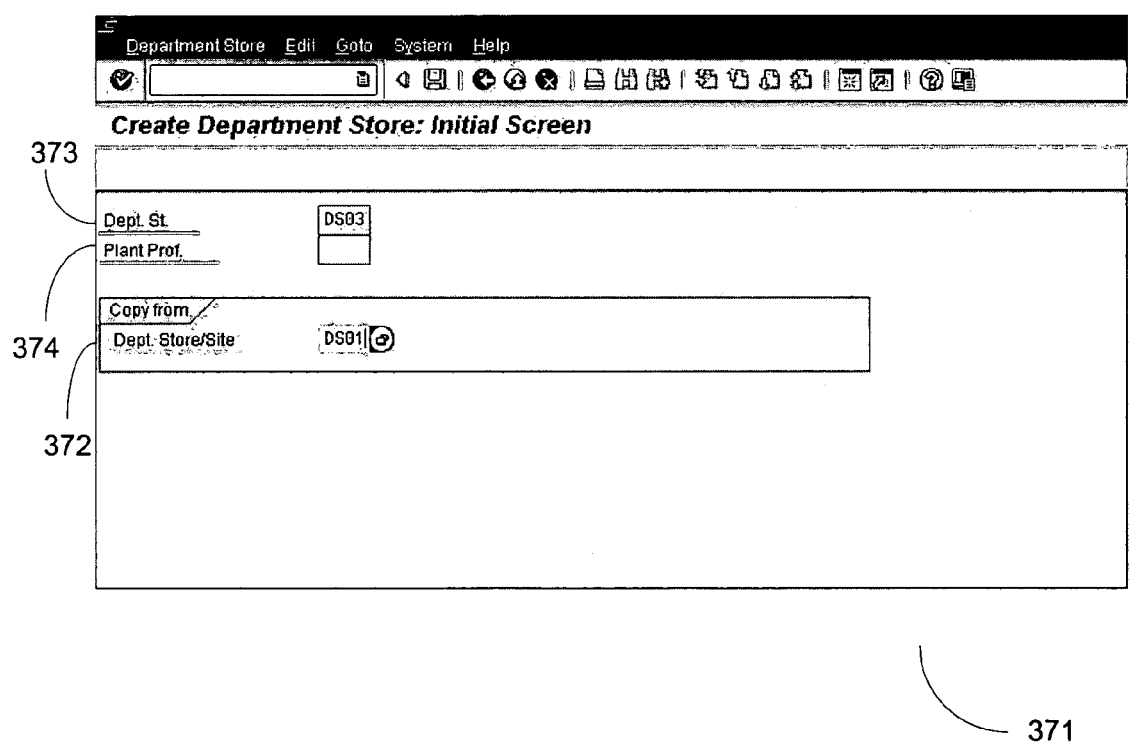
FIG. 13 shows an initial screen for the creation of a new department store.

In accordance with the principles of the present invention, a store may be designated as a department store. In one embodiment, a department store may be created without a prior store existing. FIG. 13 illustrates one embodiment of an initial creation screen 371 for a creating a department store. A department store number field 373 and a plant profile field 374 are provided. In addition, a reference department store/ site field 372 is provided which allows a user to designate an existing departments store or site to copy data from for the creation of the new department store.

Figure 18:
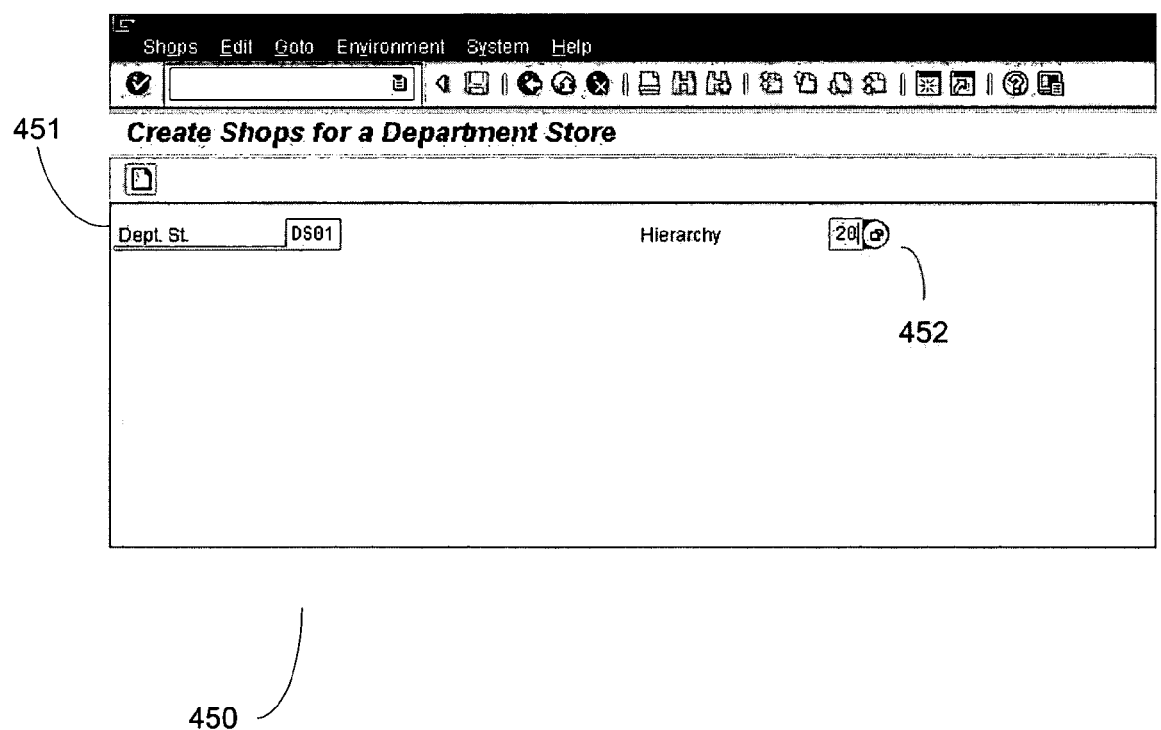
FIG. 18 shows an initial screen for the creation of a shop from a department store.
Figure 19B:
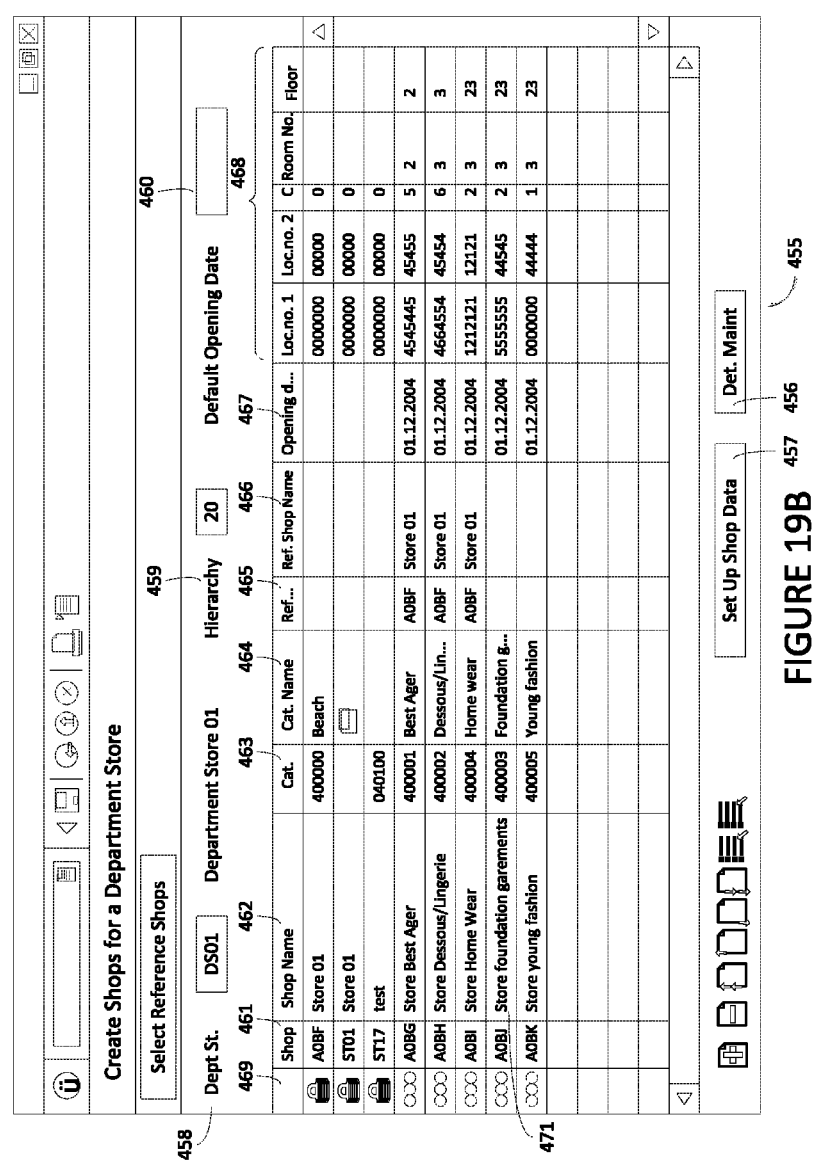

In another embodiment shown in FIGS. 18 and 19A, B, a two step creation process is utilized. FIG. 18 illustrates an initial creation screen 450 for creating a shop for a department store. The screen 450 includes department store field 451 and hierarchy field 452. A similar initial screen is described below in regard to the creation of a shop for a category (category driven vs department store driven). FIG. 19A illustrates a creation screen 455 displayed following the initial screen 450. Shops AGBG, ABBH, ABBI, ABBJ, ABBK are being created. The creation screen 455 includes a header having department store data 458, hierarchy information 459, and a default opening data 460. This information is used for each shop created in this screen. In addition, a listing of each shop 470 in the department store is provided. Shop number 461, shop name 462, category 463, category name 464, reference shop number 465, reference shop name 466, opening date 467 (can be different from the default date 460), and location information 468 are provided. In addition, buttons for calling a detailed maintenance screen 455 and a shop data setup screen 457 are provided. FIG. 19B illustrates the screen of FIG. 19A wherein shops AGBG, ABBH, ABBI, ABBJ, ABBK have been created and are now saved.

Figure 14:
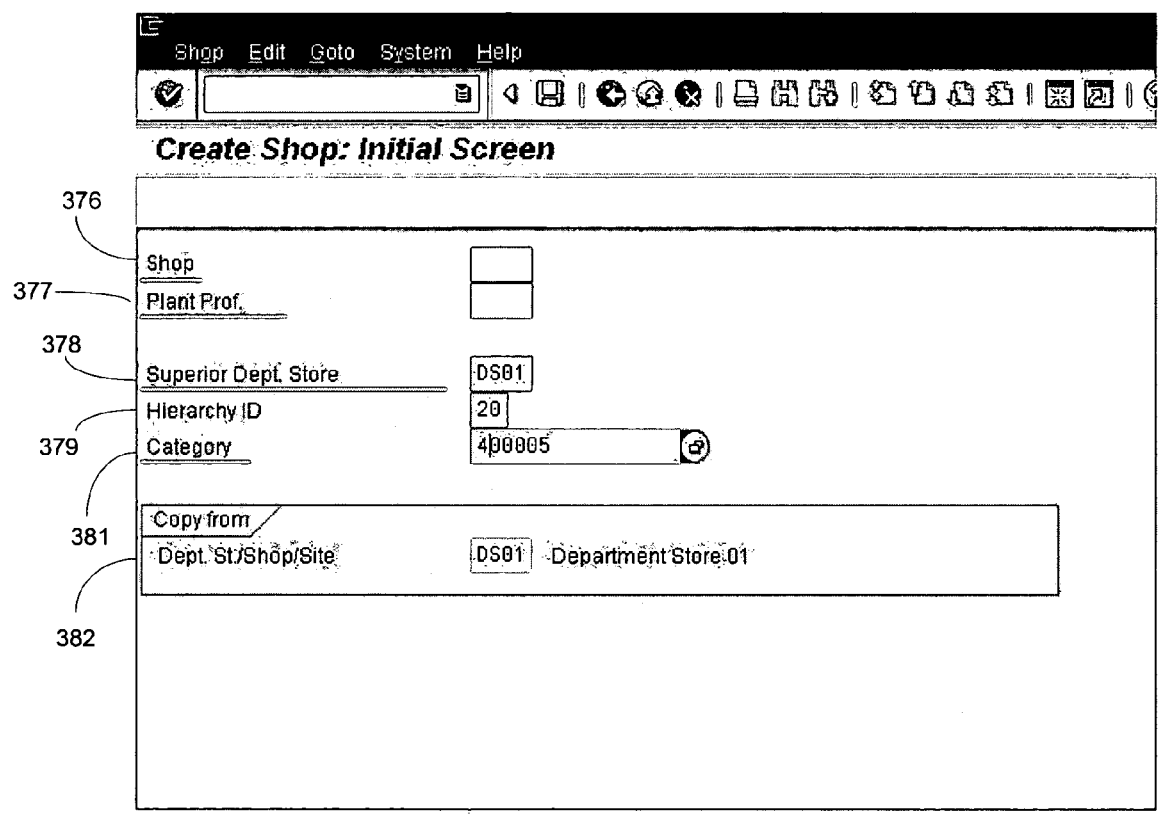
FIG. 14 shows an initial screen for the creation of a new shop.
Figure 15:
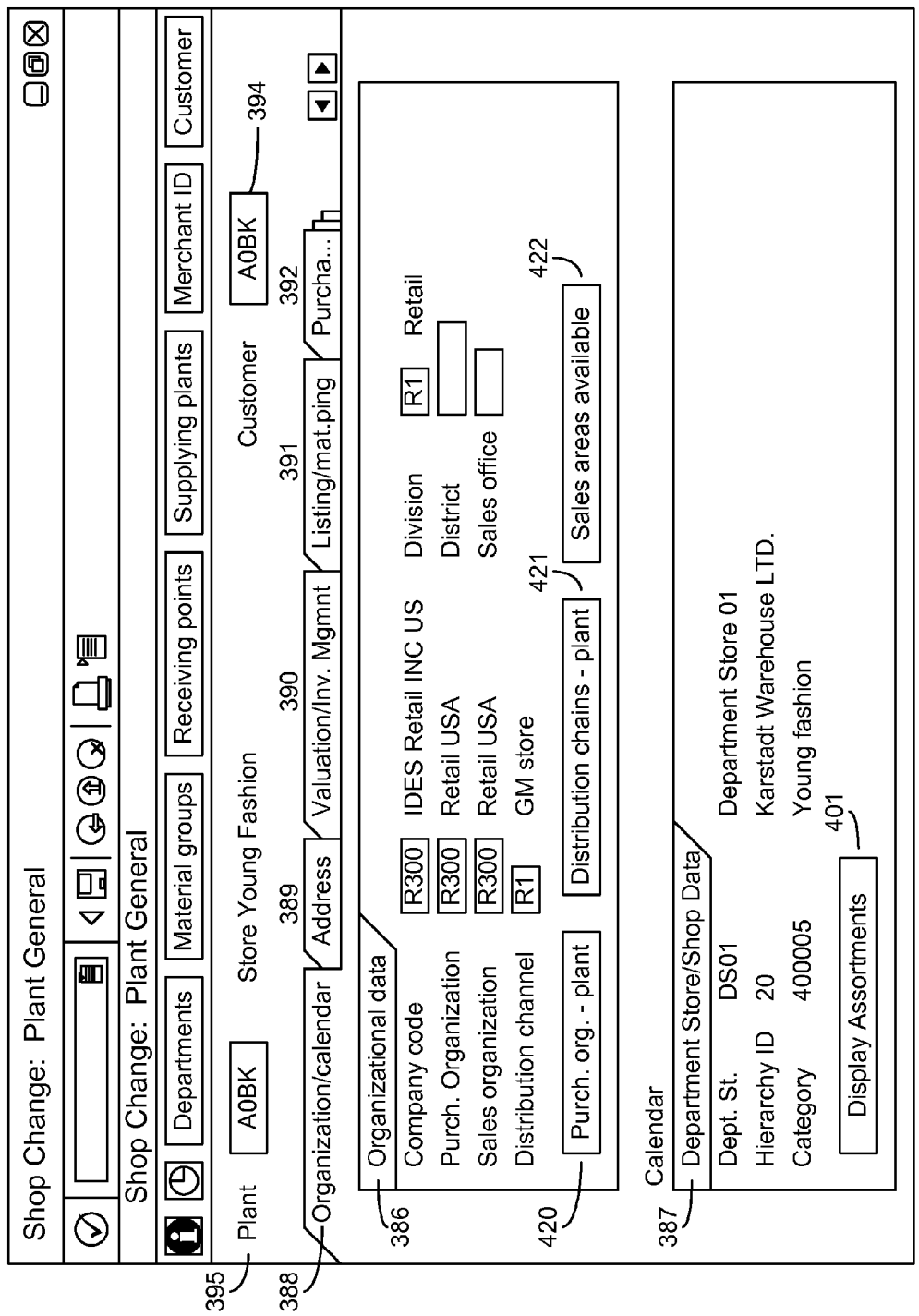
FIG. 15 shows a screen for displaying additional information regarding department stores.

In one embodiment, additional shops may be opened within an existing department store. For example, when the product range of a department store is extended, it may be necessary or desirable to open additional shops for the added products. In accordance with the principles of the present invention, additional shops can be added to a department store. In one embodiment, the added shops are based on the existing shops within the department store and comparable shops in other department stores within the enterprise. Referring to FIG. 14, an initial screen may be displayed for creation of a shop. An shop id input field 376 is provided as well as a plant profile 377. A superior (i.e. associated) department store 378 is designated. The new shop is assigned to a department store, in a bottom up type arrangement. In one embodiment, at the department store level, there is no indicator associated with a department store to indicate what shops belong to the department store. In addition, a hierarchy id field 379 is provided and a searchable category field 381 is provided. Furthermore, a field 382 is provided for a user to select a reference department store/shop/site from which to copy the data for the new shop.

In one exemplary embodiment, a new shop may be opened in multiple department stores within an enterprise. When a new group of articles is added to an enterprise, a corresponding shop may be opened in one or more department stores. Similarly, in one embodiment when a group of articles that have already been established in some department stores is rolled out to other department stores, corresponding shops may be opened in those department stores.

In addition to the opening of new shops within a department store, it may be desirable to close or temporarily limit the functionality or operation of an existing shop. For example, if a shop fails to achieve the desired popularity, has to make room for the expansion of another shop, or the offered product range is withdrawn completely from the market in order to satisfy new trends, one or more shops have to be closed. To start the closure process, a user requests a multi-shop entry point that can be used to initiate closure proceedings for a defined set of shops. In accordance with the principles of the present invention, the desired shop or shops are closed.

It may also become necessary or desirable for various reasons to temporarily block one or more shops, i.e., allowing only limited business activities. For example, in one embodiment, merchandise sales may continue for a shop, whereas reordering of the articles is suspended until further notice. In an exemplary embodiment, a user initiates a multi-shop entry point, similar to the process for closing a shop, to set blocks for a defined set of shops.

In one exemplary embodiment, new articles or goods can be added to multiple existing shops. For example, if the goods on offer in a shop are expanded such that a completely new material group is added, and this material group fits the theme of other shops as well, it must be possible to assign this material group to multiple shops—which usually have the same category (i.e., consumer theme) in a multi-shop maintenance dialog. For example, if an enterprise decides to offer batteries for sale, the batteries could be assigned to various shops within the same theme.

It may be desirable or necessary for the supplying site or region of a shop to be changed. For example, when a new distribution center is commissioned or the supply chain is adjusted for other economic or strategic reasons, this can change the supplying site for a number of shops. The same applies to the definition of the supply region. In an exemplary embodiment, the supplying site or region for a shop or shops may be changed. In order to respond quickly to changes in the logistical framework, a maintenance dialog is provided to enable change of the supplying site and supply region for multiple shops at the same time.

Figure 22A:
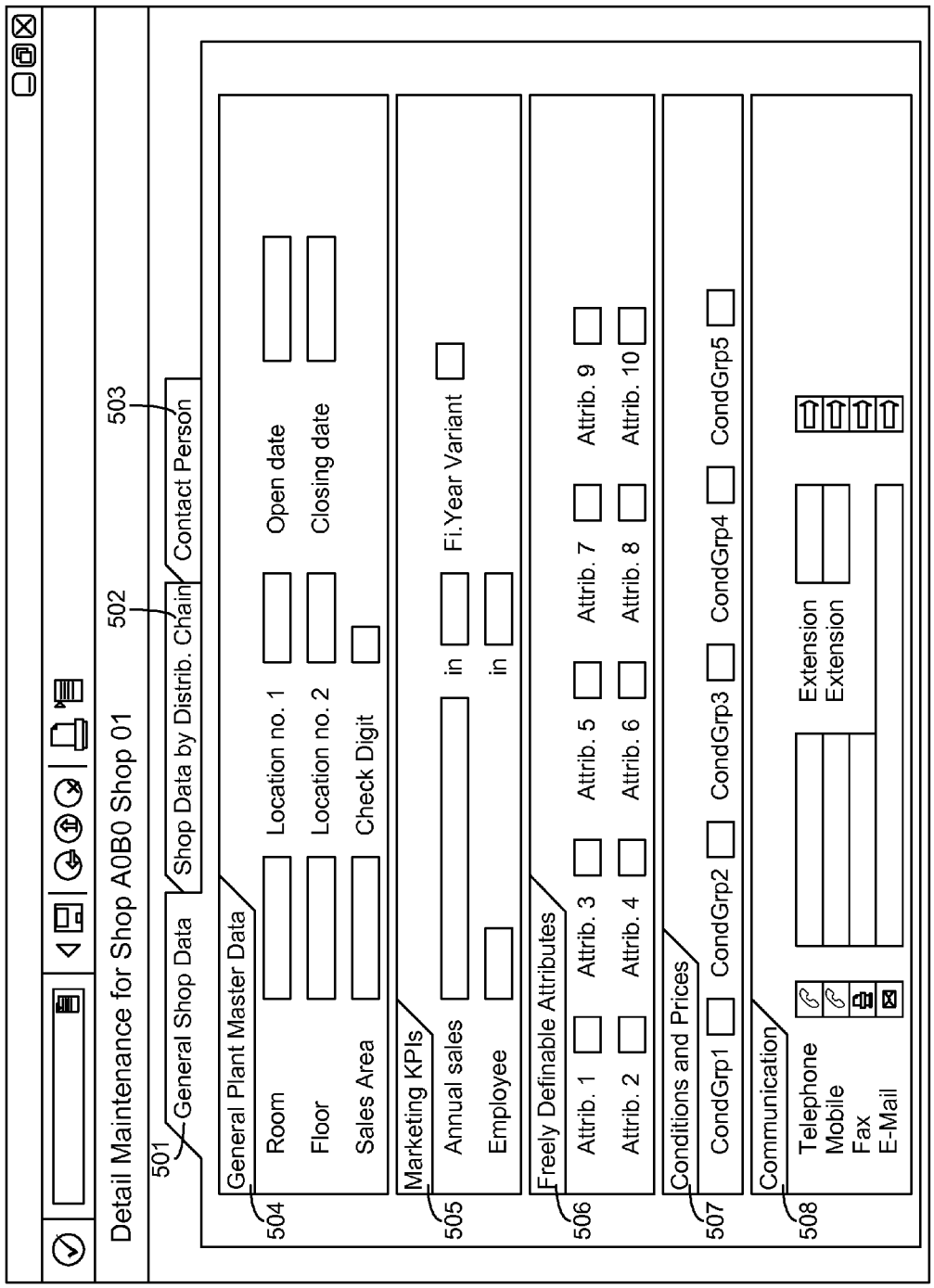
FIG. 22A illustrates a shop maintenance screen with general shop data displayed.
Figure 22B:
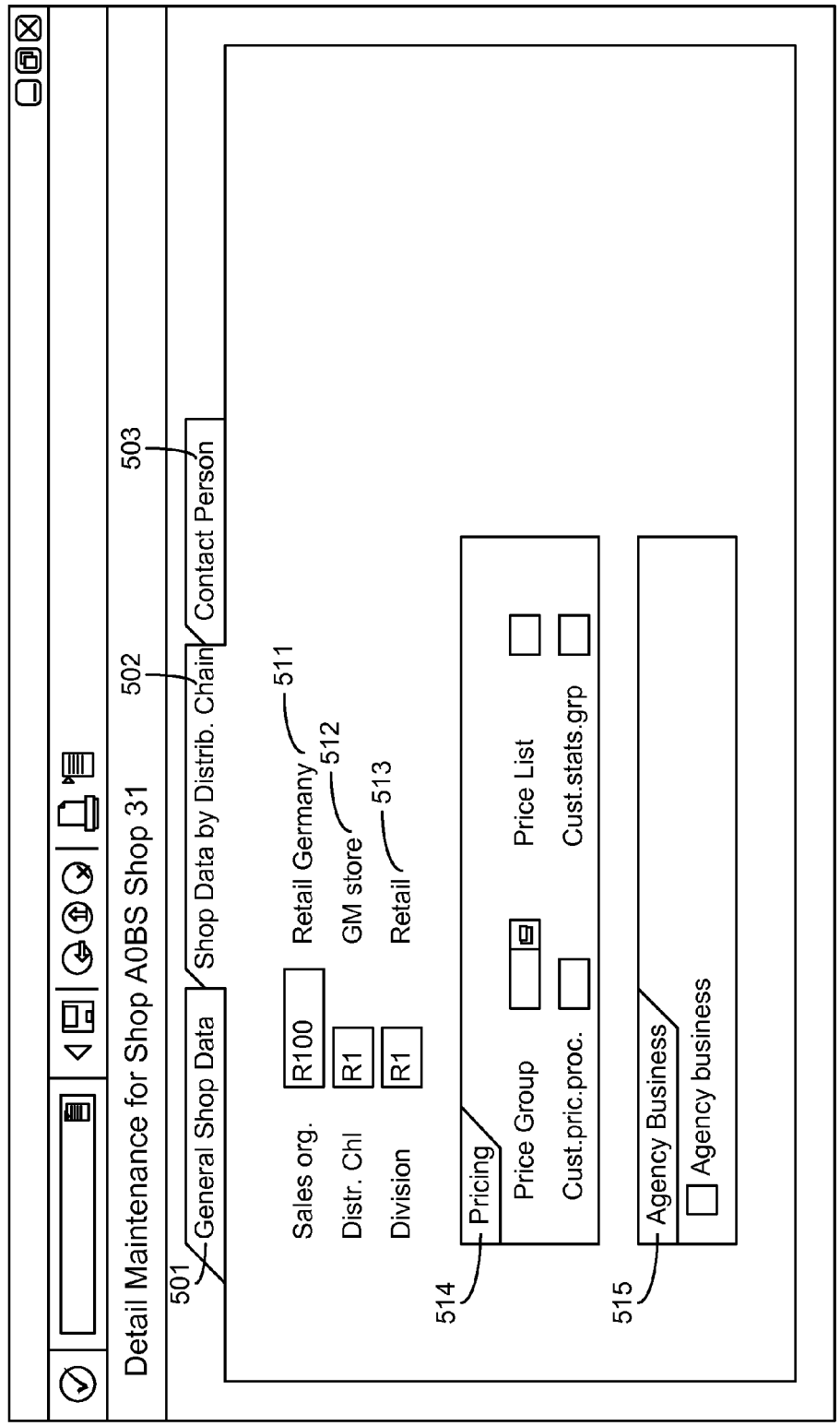
FIG. 22B illustrates the shop maintenance screen of FIG. 22A with shop data by distribution chain shown.
Figure 22C:
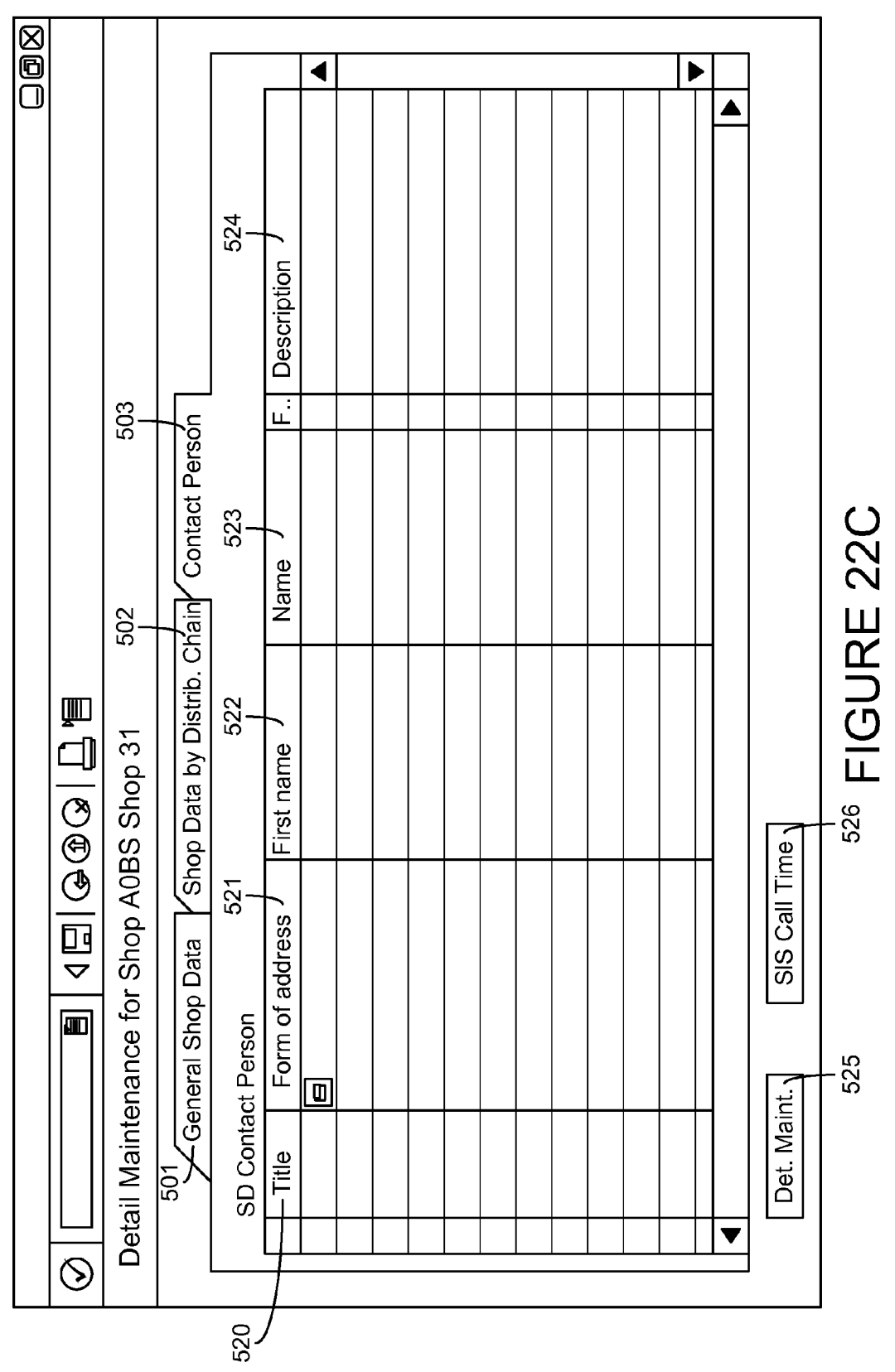

In one exemplary embodiment, user interfaces are provided for the various functions of the present invention discussed above. For example, FIGS. 22A-C depict a shop maintenance screen with a general shop data page (FIG. 22A), a shop data by distribution chain page (FIG. 22B), and a contact person page (FIG. 22C). The general shop data page includes general plant master data, marketing information, freely definable attributes, conditions and prices, and communication information. The shop maintenance screen page containing shop data by distribution chain provides information such as sales organization, distribution channel, pricing information and agency business status. The shop maintenance screen contact person page includes information such as title, form of address, first name, name, and description. In addition, a user may schedule call times from this page as well as switch to a detailed maintenance screen. Suitable maintenance dialogs will keep the quantity of shop master data that has to be entered to a manageable minimum.

In one embodiment, the department store/shop maintenance functions use an interface that enables the simplified creation/change of site master data based on copy templates. To simplify master data maintenance for shops, the master data of the assigned department store is used. In this process, the master data of the department store is copied to the new shop. In another embodiment, the master data of an optional reference shop (from the same or another department store) is used as the template. However, any assigned assortments (or store type definitions) are not copied, nor is any other assignment data that defines the operative usability of a site. This additional data (assortment or assignment data) has to be defined for the specific shops being added during a subsequent process (such as operational assortment planning and control). Moreover, in one embodiment, creating a new shop does not automatically trigger subsequent processes, analogous to the response when a shop is created in site master maintenance. A user exit can be utilized to trigger a workflow event, in one embodiment. For example, a user exit can trigger a notification when a new shop is created. A user exit is a program which is normally tailored to a specific user's needs. Where the term user exit is used, it should be understood that a program could be either tailored or generic.

When a new shop is created, the shop data is defined for the organization levels (such as distribution chain, company code, and so on) specified by the department store. It is not possible to assign different organizational levels to a shop than those defined for the department store with which the shop is associated. This is only possible when the standard site master maintenance transaction is used to create the shop.

The department store/shop maintenance function only provides support for shops. The simplified maintenance of department stores is outside of the scope of the department store/shop maintenance function, because the standard site master maintenance transaction has to be used to maintain department stores. In addition, in one embodiment, since changes to the master data of a department store or shop are unusual, no mass change function to change the master data for multiple sites will be provided. In one embodiment, support for store closures is limited to maintaining the closing date and setting the block status.

Within the framework of the department store process, appropriate search help functions may provided in accordance with the principles of the present invention to support the selection of department stores and the navigation through a hierarchy from department store to shop level, to select a shop—or multiple shops when supported by the calling application. In one embodiment, a check is performed when a department store is to be closed to ensure that a department store can only be closed when all the shops contained therein have already been closed. In one embodiment, a navigation option to the respective maintenance dialogs is provided, to enable the maintenance dialogs to be called from within article hierarchy maintenance.

In an exemplary embodiment, a check is performed to ensure that the department store to which the new shop(s) will be assigned has already been created as a store with store category "department store" in the site master maintenance. This check is necessary as it is not possible to create department stores in the new department store/shop maintenance transaction.

Figure 7:
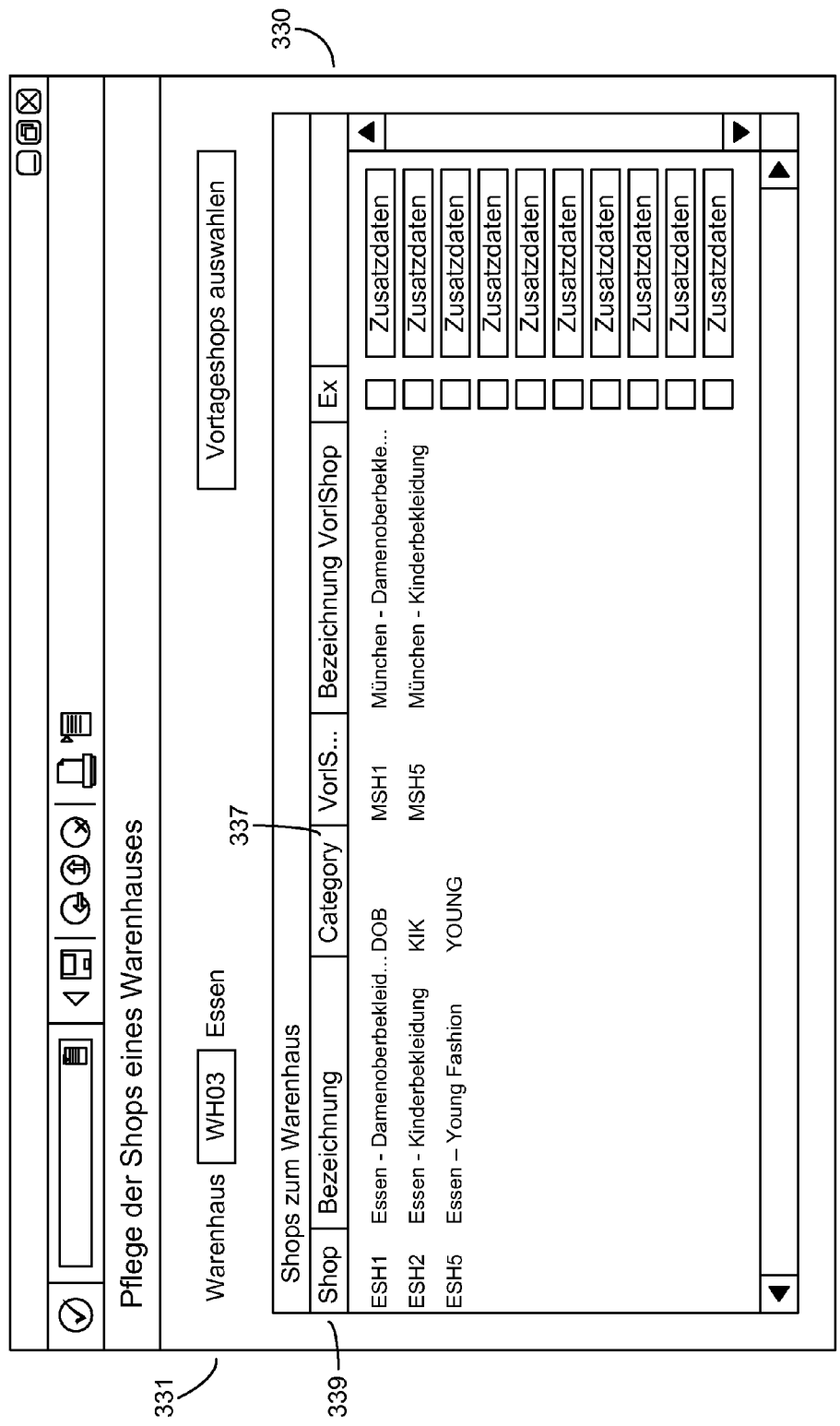
FIG. 7 shows a maintenance screen for shops in a department store.

Once the department store has been created with its master data, a new maintenance dialog (maintain department store/shop) can be used to add shops to that department store. The new maintenance dialog, in one embodiment, has a structure like the one shown in FIG. 7. The creation screen 330 includes a field 331 for designating a department store to which the new shop will be assigned. In addition, a table is provided for displaying shops assigned to the department store. The shop number 339 and category 337 are displayed.

Figure 16A:
FIG. 16A shows a search screen for searching shops in a department store.
Figure 17A:
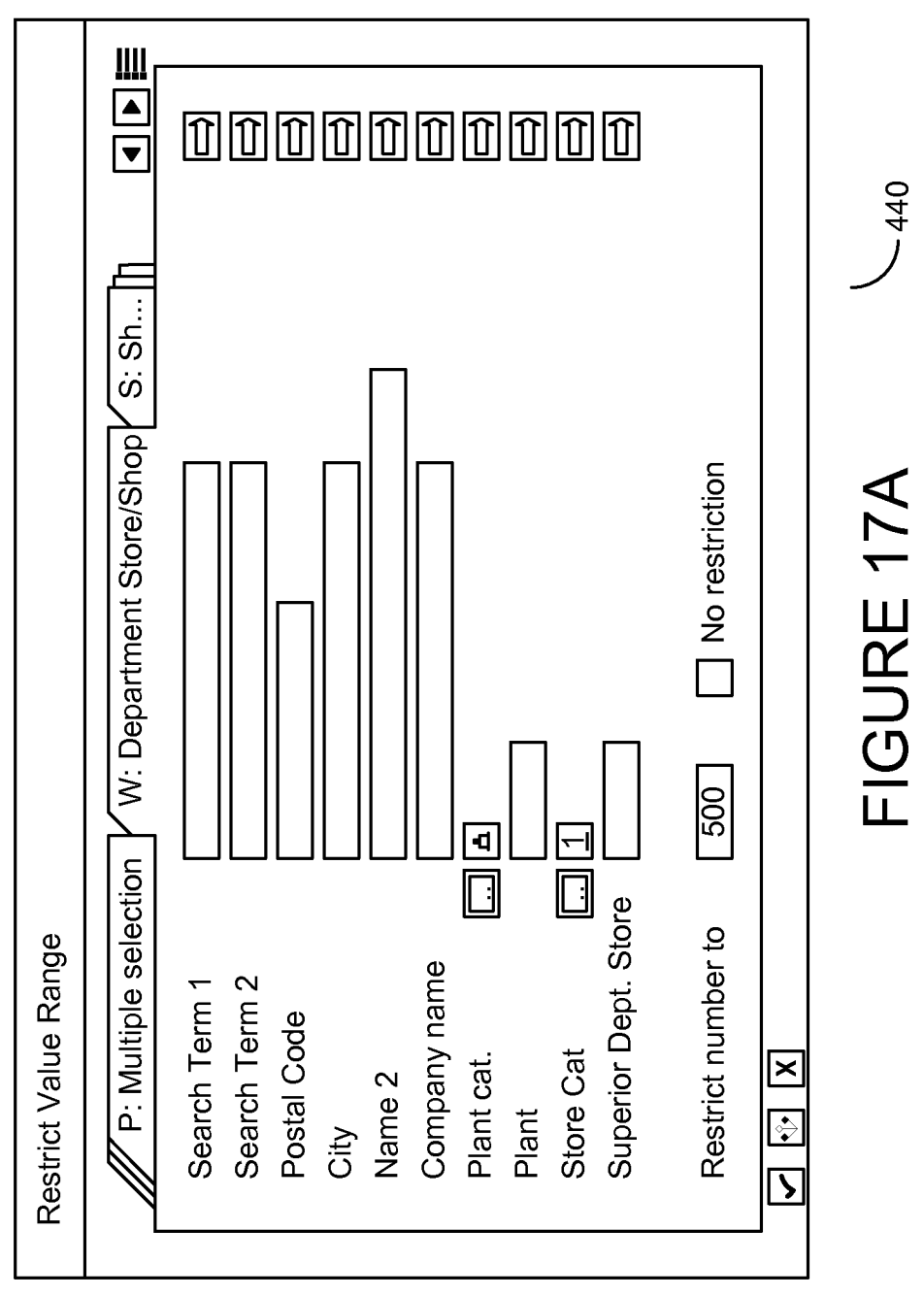

The new maintenance dialog is accessed from a department store. For example, in one embodiment, a pushbutton is provided which (such as "Select Reference Shops") can call a function to select reference shops, which are then used to set up the individual shops in that particular department store. A search help function is provided in one embodiment to aid selection of the reference shops. This could look like the example in FIG. 16A. A search screen 423 is provided. The search results are displayed on a screen 430. In a further embodiment shown in FIG. 16B, the department stores appear initially in a hierarchy display, and the department store nodes 431 can be expanded to display the assigned shops 432. The screen 430 includes information regarding department store/shop number 434, description 435, hierarchy assignment 436, and the category 437. Additional search screens may be provided. FIG. 17A illustrates a search screen 440 which queries addresses. FIG. 17B illustrates a search result list screen 442 generated from FIG. 17A. The department store/shop number 443 is provided. In addition, the postal code 444, city 445, and name 446 are displayed. This function allows for easy location of geographically close plants.

One or more of the displayed shops can be selected, depending on how many shops are to be created with references in the involved department store. When the search help function is exited, the selected shops will be copied, line by line and sorted, to the "Reference Shop" column of the maintenance dialog. In one embodiment, as an alterative or supplement, the search help function can also be selected in the "Reference Shop" field; only a single shop can be selected as a reference for the corresponding input line here. The entry of a reference shop is optional. If no reference shop is specified, the data for the new shop can only be set up based on the corresponding department store data.

The name of the new shop then has to be entered. A user exit can be used to build the shop name user-specifically—for example, based on the department store name and a category name, or in connection with the name of the reference shop—and copied to the name field as a default value. Users can also use this user exit to control whether the name is adjusted automatically when the category or reference shop is changed, and how manual changes to the name should be handled—for example, a corresponding check function can also ensure that users can only make defined changes to system name proposals.

In one embodiment, the assignment to a category (i.e., a specific node within the article hierarchy flagged as a category) can also be entered if necessary. If the option to assign articles several times within the article hierarchy is active in customizing, however entry of a category is mandatory. This response is analogous to the planned response in site master maintenance, where entry of a category will also be mandatory if multiple assignment of articles in the article hierarchy is active. Category selection will be supported by a search help function for the article hierarchy. When a category is entered, the system checks whether this category is already assigned to a different shop of the department store, and prevents assignment if it is. This ensures that a category is only used once in each department store.

In one embodiment, a unique shop number can also be entered by a user. If a shop number is not entered, it is determined internally from a defined number range interval.

Figure 9:
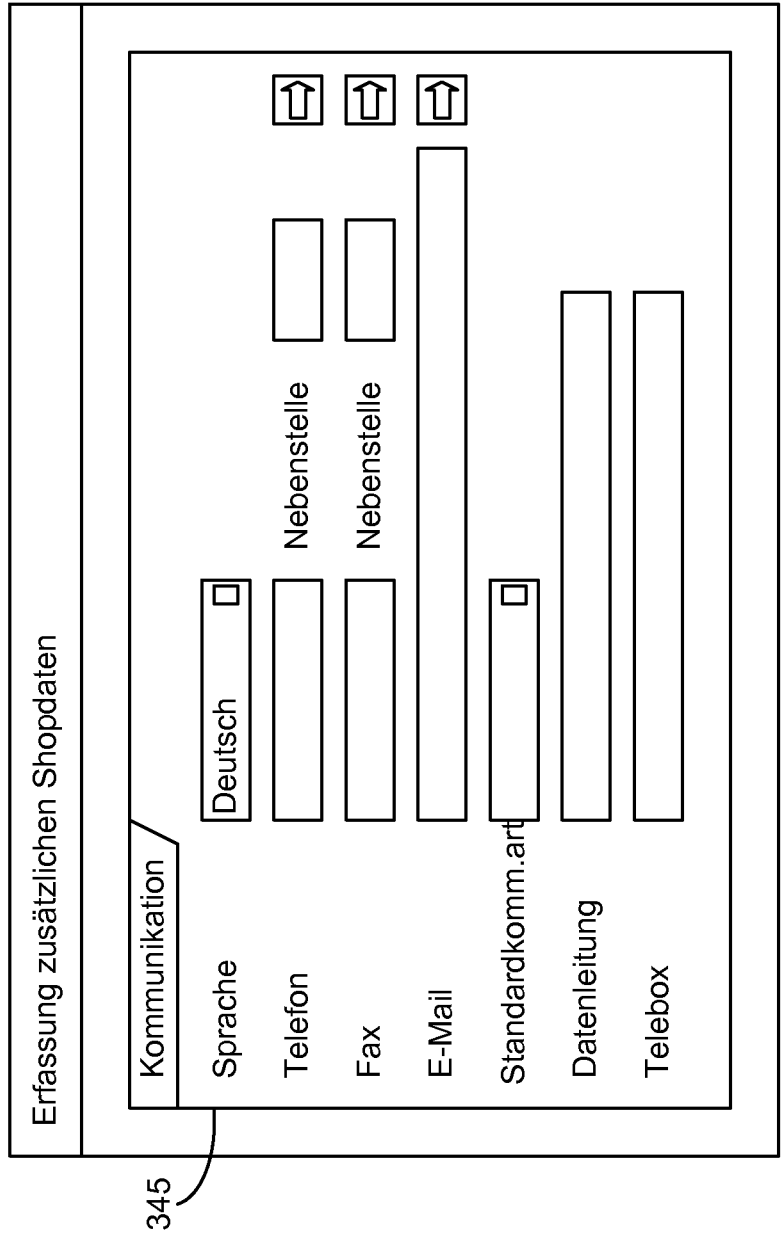
FIG. 9 shows a graphical user interface display for entering additional shop data.

The vast majority of master data can be set up based on the data of the department store, combined with the data of the optional reference shop. There is also a small amount of data that usually has to be maintained shop-specifically, however. An additional data screen 343 is displayed in one embodiment, which could look like the example in FIG. 9. The additional data screen 343 includes specific data fields 345 which can be used to provided further information for the shop.

Default values for the shop-specific data fields will be determined in the additional data screen, based on the department store or reference shop data, to the extent possible. If the user does not display the additional data screen, only the data that can be derived from the department store or reference shop will be saved as default data, and can then be adjusted in a later maintenance transaction. A standard maintenance screen with the typical shop-specific fields will be provided. In one embodiment, this maintenance screen can be replaced by a user maintenance screen, using a user exit, if different and/or additional fields have to be maintained for a specific user. Since only a few fields are actually needed for shop-specific maintenance in the standard system. In one embodiment, they are maintained directly in the main screen. An option to navigate to an additional data screen will be provided to support user maintenance screens. This standard merging logic can be influenced by a user exit, in order to define the reference level for the individual data fields (department store or reference shop) and/or merge additional, user-specific reference data.

In addition to the new maintenance dialog, a shop can also be created and assigned to a department store in the standard transaction for site master maintenance. However, if more than one shop has to be created for a department store, a shop is to be created for multiple department stores, use of the new maintenance dialog is recommended—particularly since the functions for collecting the reference data, including the user exits, are only available in the new maintenance dialog. The standard transaction for site master maintenance only supports a simplified procedure for determining the reference data (either department store or shop as reference; no merging).

Figure 8:
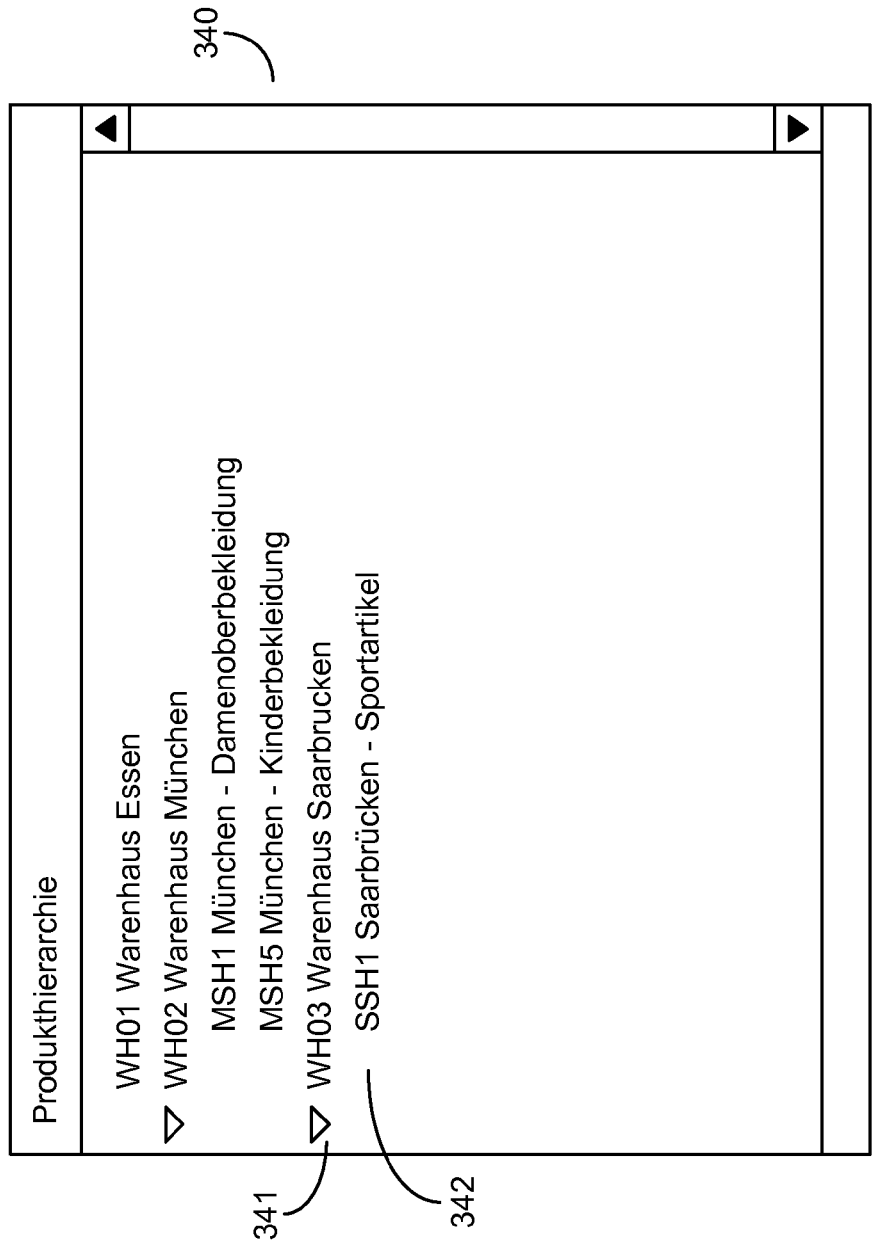
FIG. 8 shows a search help screen for shops of a department store.

After shops have been assigned to a department store, it may be necessary to create additional shops within a department store. The same shop maintenance dialog can be used to add additional shops, with the department store as entry point. The functional scope is similar to the process flow for creating a new department store with assigned shops. In one embodiment, the only difference from the process described in this section is that the existing shop assignments are also displayed in this scenario. Existing shop assignments cannot be maintained, because this maintenance dialog is only intended to support new assignments. In one embodiment, if existing shops have to be changed, an option to go to the standard transaction for site master maintenance will be provided. In one embodiment a pushbutton (such as "Select Reference Shops") can call a function to select reference shops as shown in FIG. 8, which are then used to set up the individual shops in that particular department store. A search help function will be available to aid selection of the reference shops: the department stores appear initially in a hierarchy display 340, and the department store nodes 341 can be expanded to display the assigned shops 342.

Figure 20:
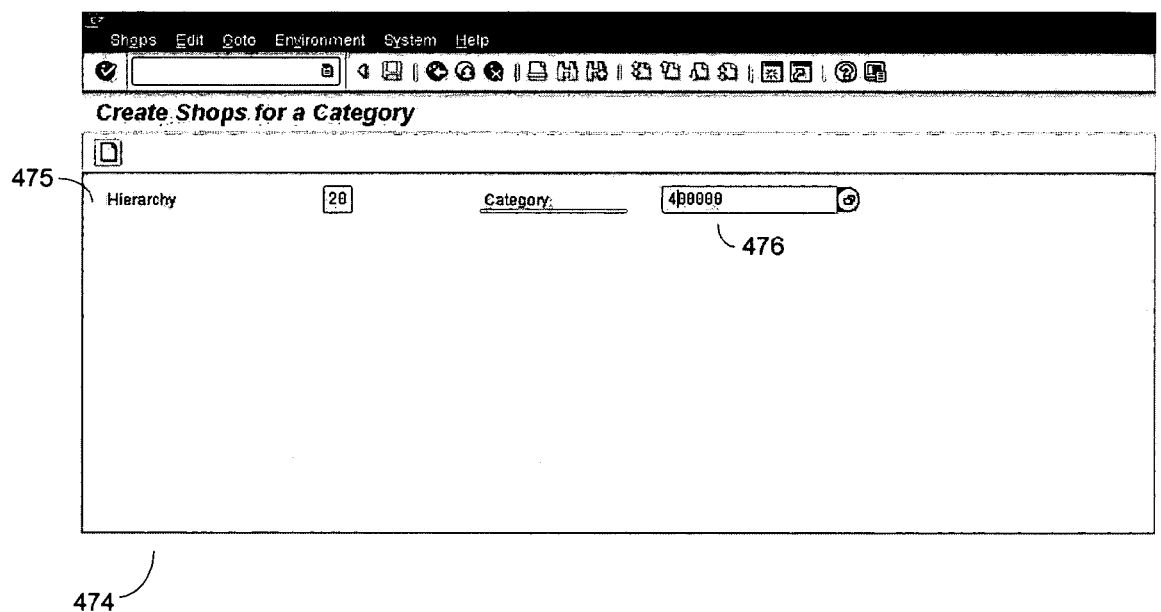
FIG. 20 shows an initial screen for the creation of shops of a specific category.

If an enterprise intends to expand its overall article assortment and this expansion involves a completely new category (consumer theme), a new shop has to be created. This new shop has to be set up in all the existing department stores that will sell the new category. For this reason, a second shop maintenance dialog is be provided that supports the assignment and creation of shops with the same theme to a selected set of department stores, with the category as the starting point. FIG. 20 depicts an initial screen for creation of a shop from a category. A hierarchy field and a category field are provided for user input. In one embodiment, the category field is operatively connected to a search function. If a category already exists as a shop in several department stores, the same maintenance dialog can also be used to establish this category in other department stores. FIG. 21 illustrates a screen for creation of shops for the category selected in the initial shop creation from a category screen of FIG. 20. The shop creation from a category screen includes hierarchy information, a default opening date, a default reference shop and the category for each of the shops associated therewith. In addition, a tabular listing of the associated shops is provided. The table of shops includes information such as department store name, shop number, shop name, reference shop number reference shop name, opening date, and various items of location information. Although default values can be established such as the default reference shop and the default opening date, the user can alter this data.

FIG. 11 illustrates another embodiment of a screen for creation of a shop from a category 347. The category 348 is entered. A table is provided displaying the shops in that category 348. The table contains department store number 357, department store name 355, shop number 354, and shop name 353. As previously discussed in regard to FIG. 20, the maintenance screen can be used to create shops within the desired category. Mass creation is supported by allowing a user to create shops in various department stores without leaving the screen 347.

The shop maintenance dialog is accessed from a category (consumer theme). In one exemplary embodiment, category selection is supported by a search help function for the article hierarchy. The general process flow is comparable to the flow for creating additional shops in a department store. To create the new shops, the relevant department stores must already have been defined as stores with category "department store". It does not matter whether the department stores already have shops or not. The decisive factor is whether the specified category already exists as a shop in the involved department store(s). The department stores that already have the category in a shop are displayed for information purposes. Additional shops can now be added to the list, for the department stores that do not have the category in question yet.

In one embodiment, a pushbutton (such as "Propose Department Stores") is provided to select the department stores in which the new shop will be created. In an exemplary embodiment, a search help function is available to select the department stores; all existing department stores can be displayed. One or more of the displayed department stores can be selected. When the search help function is exited, the selected department stores will be copied, line by line and sorted, to the "Store" or "Department Store" columns of the maintenance dialog. Only the department stores that do not have the shop yet are used. At the same time, a check will ensure that the same department store is not entered several times during manual entry.

In one embodiment, an input field "Reference Shop" is provided. The input field "Reference Shop" supports the search help function described in section creating a new department store with assigned shops, to select a reference shop for each department store as necessary. The selected reference shop can belong to any department store and does not have to belong to the selected category. The entry of a reference shop is optional. If no reference shop is specified, the data for the new shop can only be set up based on the department store data. In one embodiment, the selection of several reference shops is not supported since the selected reference shops are returned in a defined sort sequence that usually does match the sort sequence of the department stores, because the reference shops would be copied to the "Reference Shop" column line by line, without an option to save the respective reference shop in the line of the matching department store. In an exemplary embodiment, to support the mass entry of reference shops, a copy function is provided here to copy a specific reference shop to multiple department stores. Since it is more likely in this group that all the new shops in the individual department stores will use the same reference shop than a different reference shop being required for each department store—because the category assignment is the same—multiple selection of reference shops is not required.

The assignment of the new shops to the category is derived automatically from the category used at the start of the transaction. The name of the new shop then has to be entered. In one embodiment, a user exit can be used to build the shop name user-specifically. For example, the shop name may be based on the department store name and a category name, or in connection with the name of the reference shop. The name is copied to the name field as a default value. Users can also use this user exit to control whether the name is adjusted automatically when the reference shop is changed, and how manual changes to the name should be handled—for example, a corresponding check function can also ensure that users can only make defined changes to system name proposals.

Figure 23:
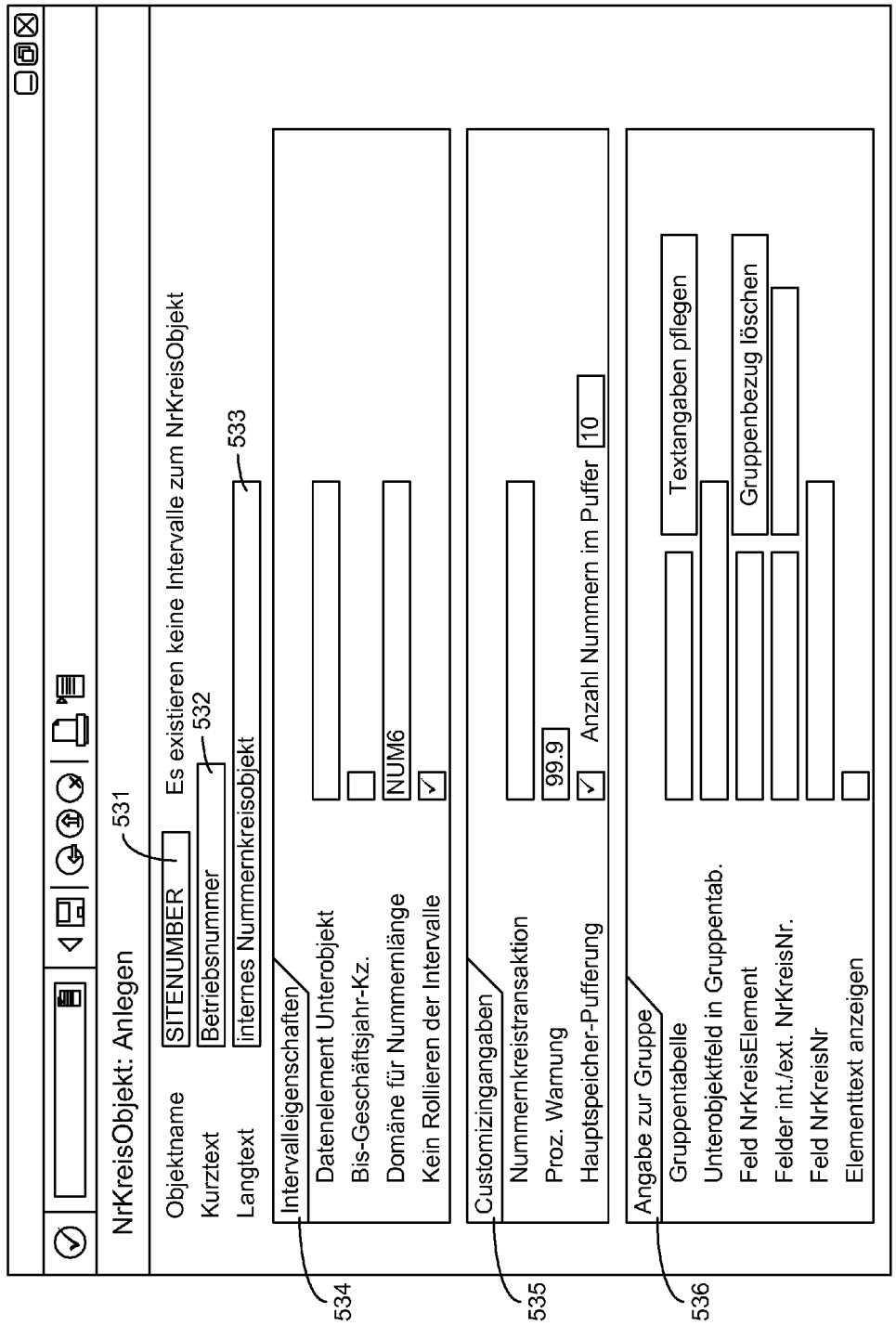
FIG. 23 depicts a screen for assigning a shop number to a shop.

In one embodiment, a unique shop number can also be optionally entered. Thus, a user may enter a name or, if a shop number is not entered, a name is determined internally from a defined number range interval. FIG. 23 depicts a shop number maintenance screen 530. A header is provided containing the shop number 531, summary 532, and full text 533. In addition, a field is provided for interval characteristics 534, for customized data 535, and for organizational information 536.

The vast majority of master data can be set up based on the data of the department store, combined with the data of the optional reference shop. There is also a small amount of data that usually has to be maintained shop-specifically, however. In one embodiment, an additional data screen can be displayed for this purpose, analogous to the procedure described in relation to creating a new department store with assigned shops. The process of merging the data from the department store and, optional, the shop is also analogous to the procedure described in relation to creating a new department store with assigned shops.

When a new shop is created in one of the new maintenance dialogs, all the data is set up based on existing data. This also applies to the data that can be maintained shop-specifically. The assigned department store is the primary source of data for the new shop. In addition, the data from a reference shop can also be used if necessary. In one embodiment, a user exit can also be used to adjust the merge operation to specific user requirements. One embodiment of a process for merging the data for a new shop is shown in FIG. 11.

In step 1, Version one 362 of the reference data for the new shop is generated. If the department store is known, its site master data 360 can be determined. If an optional reference shop is specified, its site master data 361 is also read and merged with the department store data—for example, the address data and store hours are copied from the department store, while data regarding valuation, inventory management, and listing are taken from the reference shop first. The result is the first version 362 of the reference data for the new shop.

Which master data fields are taken from the department store in the standard settings, and which fields are taken from the reference shop, is described in greater detail below.

In step 2, Version two 364 of the reference data for the new shop is created. In the second step, the merged reference data (version 1), the site master data of the department store, and the site master data of the reference shop are passed on to a user exit, in which the default merge sequence can be overridden user-specifically—to take the default values for certain fields from the reference shop instead of the department store, for example, or merge additional reference data from other sources. A customer exit 363 may also be used. This results in the second version 364 of the reference data for the new shop.

In step 3, Version three 367 of the reference data for the new shop is generated. The name and category which were entered in the main screen 366 of the shop maintenance dialog 330 are copied to the merged reference data. This results in the third version 367 of the reference data for the new shop.

In step 4, Version four 369 of the reference data for the new shop is created. In one embodiment; shop-specific data 368 can be entered in an additional screen 343 if necessary. If the merged data is present in the additional screen, it appears as default values. If certain fields from the additional screen are also contained in the main maintenance screen, the merge process for these fields was already carried out in phase 3.

When a new shop is created, in one embodiment an additional information screen 385 is available. The screen 385 includes plant 395 and customer 394 information. Organization 388, address 389, valuation 390, listing 391, and purchasing 392 pages are included. The screen 385 may include buttons to call purchase organization by plant 420, distribution chains by plant 421 and sales areas available 422.

Figure 24:
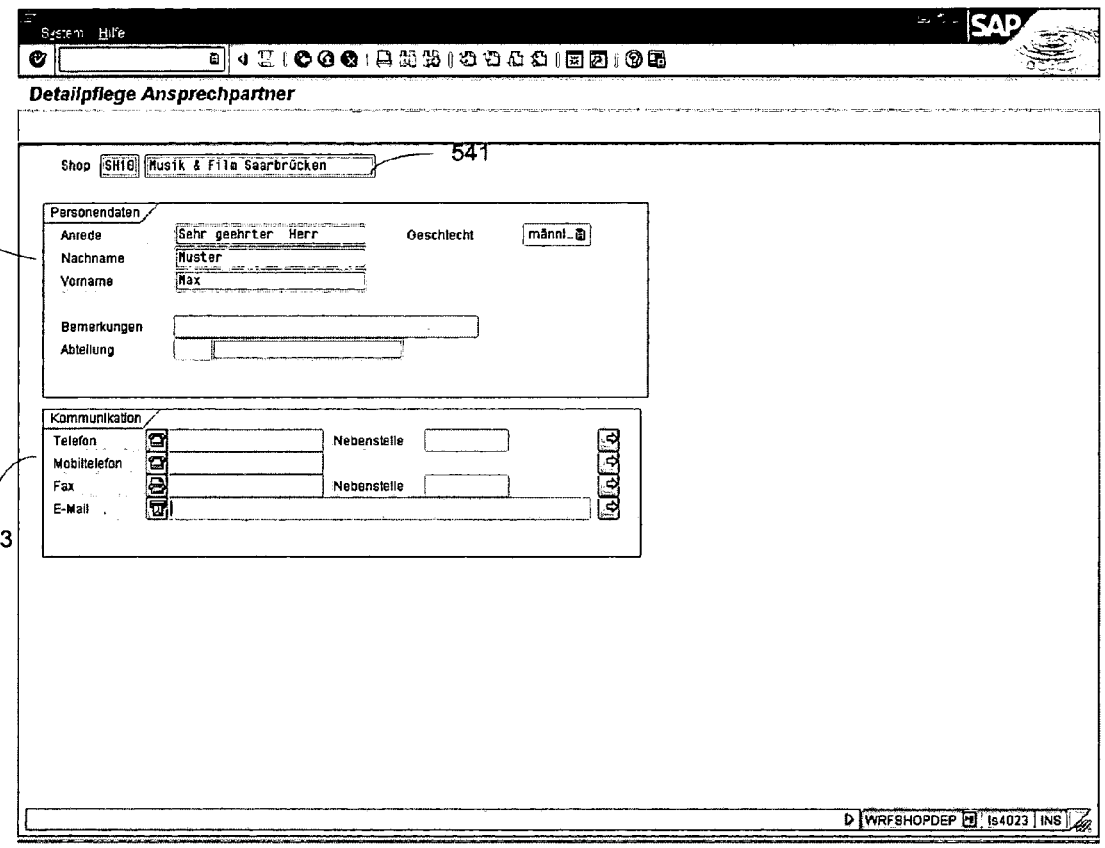
FIG. 24 illustrates an additional detailed maintenance screen for a contact person.
Figure 25:
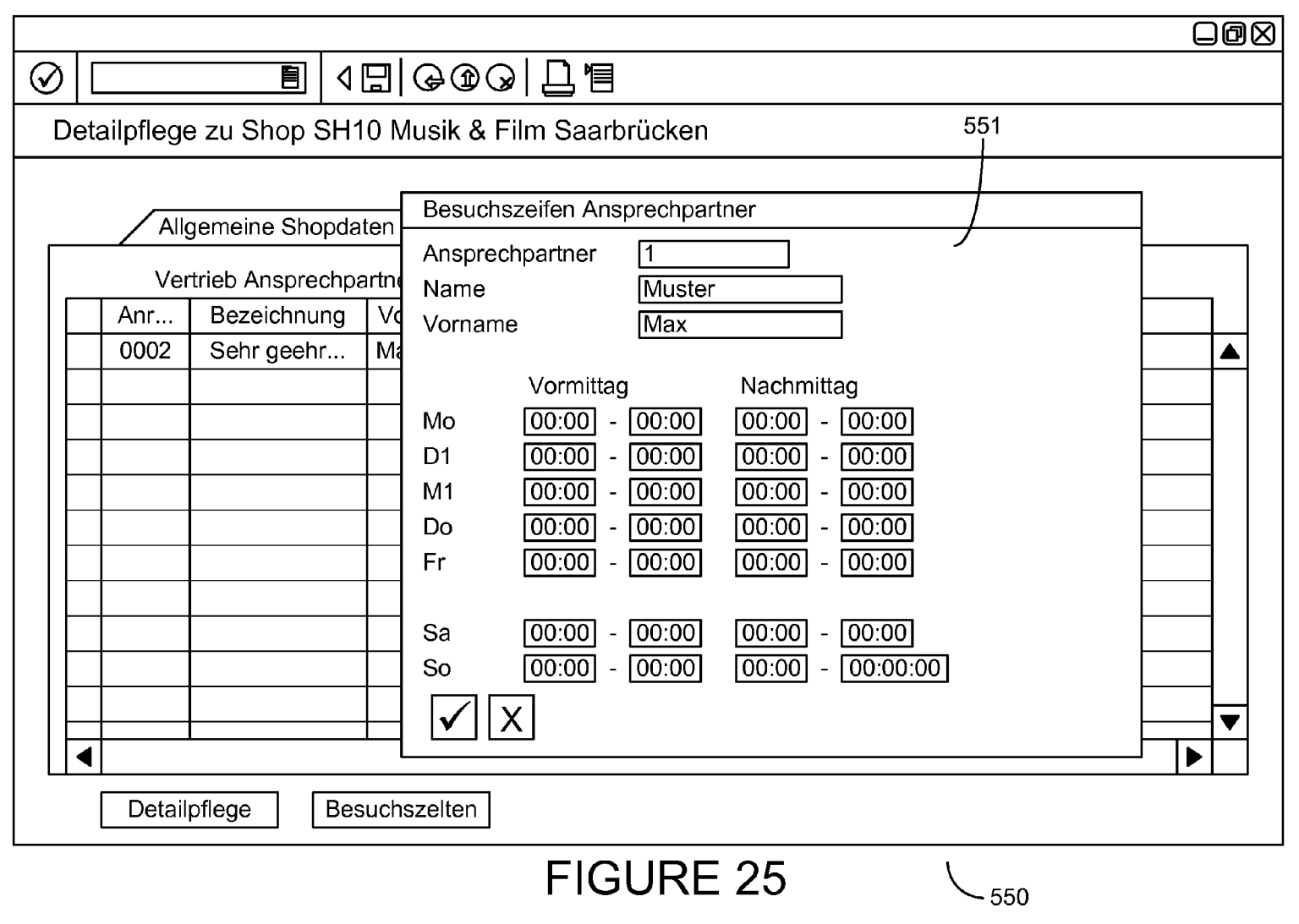

In another embodiment, a detailed maintenance screen 500 is provided as illustrated in FIGS. 22A-C. FIG. 22A shows the general shop data tab 501. This tab 501 displays general plant master data 504, marketing information 505, freely definable attributes 506, conditions and prices 507, and communication information 508. As shown in FIG. 22B, the shop data by distribution chain tab 502 includes sales organization information 511, distribution channel information 512, division assignment 513 as well as pricing information 514 and agency business information 515. The contact person tab 503 includes information for the contact person associated with the shop. The information includes title 520, address 521, first name 522, last name 523 and a description 524. In addition a button is provided to call a further detailed maintenance screen 525 and a call time screen 526. FIG. 24 illustrates the detailed maintenance screen 540 for the contact person. The screen 540 includes personal data 542 and communication information 543. FIG. 25 illustrates a call schedule screen 550 having a detailed call calendar 551 for indicating the times the contact is available.

When a new shop is created, it makes sense to copy most of the fields that can be maintained in the dialog from the assigned department store. Copying from a reference shop also makes sense for individual fields. Shop-specific data has to be entered for a small number of fields, because
  No useful default data could be derived from the department store or reference shop level
  A derived default value has to be refined
  A derived default value can only be used modified form
This results in the three categories of fields that are described below, namely field groups with reference level "department store", field groups with reference level "reference shop"; and shop specific fields. The field groups are listed in line with the maintenance screens/subscreens for site master maintenance.

Certain field groups are provided with reference level "department store". In the first step (see Phase 1 in section regarding defining reference data for a new shop), all of the department store data is copied to the new shop. If necessary, this data can be overwritten by other default data later. If it is not possible to record usable master data for the department store (room number or floor number, for example), no default value can be provided for the new shop.

In individual cases, it may also be possible to enter a basic value at the department store level and then expand/refine it at the shop level. For example, if the phone extensions of a department store all start with "7" and are four-digit, the value "7XXX" could be defined for the department store; it would not have any operational meaning, but merely serves as a template for the shops.

In one embodiment, the default logic for the department store data involves all the data listed below, which is contained in the maintenance screens or subscreens of the site master maintenance transaction. After the department store data is copied, custom adjustment of all proposed field contents is possible within a user exit.

In one embodiment, general site master data includes:
a) Initial screen
  Site profile
b) Organization/calendar
  Organizational data
  Calendar
c) Address
  Name
  Search terms
  Street address
  PO box address
  Communication
  Comments
  Tax information
d) Valuation/inventory management
e) Listing/requirements planning
  Listing
  Requirements planning
f) Purchasing/distribution
g) POS
h) Layout/blocks
  Layout data
  Blocks
i) Opening times
  Opening times
  Opening/closing
j) Receiving points
k) Supplying sites
l) Merchant ID In one embodiment, the following data is not integrated in the proposal logic:
a) Departments
  Not relevant here, because the shop assumes the function of the department
b) Material groups
  Material groups are only copied from the reference shop; if material groups are assigned at the department store level (to procure articles that are not passed on to consumers), these material groups must not be passed on to the shops.

In one embodiment, debit-side site master data includes:
a) Initial screen
  Organizational levels of the site
b) Control
  Account control
  Tax information
  Reference data/region
c) Additions—blocking data
  Posting block
  Sales blocks
d) Additions—deletion flags
  Deletion flags
  Deletion blocks
e) Environment—Additional user data (central)
  Freely definable attributes
  For condition determination and pricing
f) Marketing
  Classification
  Key performance indicators
  Acquisition
g) Payment transactions
  Bank details
  Payment transactions
  Alternative payer in document
h) Payment transactions—payment cards
  Payment cards
i) Payment transactions—bank data
  Address
  Control data
j) Payment transactions—alternative payer
  Alternative payee
k) Unloading points
  SD unloading points l) Unloading points—goods receiving hours
m) Foreign trade
  SD export data
  Use
  Military classification
n) Contact persons
  SD contact persons
o) Contact persons—sales call times
p) Contact persons—details
  Header data
  Person
  Communication
  Company
q) Account management—accounting
  Account management
  Interest calculation
  Reference data
  Default data for tax reports
r) Payment transactions—accounting
  Payment data
  Automatic payment transactions
  Payment advice notes
s) Accounting correspondence
  Dunning data
  Correspondence
  Payment notice to
t) Insurance—accounting
  Export credit insurance
u) Sales—sales area
  Order
  Pricing
  Agency business
v) Sales—sales area—product attributes
w) Shipping—sales area
  Shipping
  Partial deliveries
  General shipping data
x) Billing—sales area
  Billing
  Terms of delivery and payment
  Accounting
y) Taxes—sales area
  Taxes (sales)
z) Taxes—sales area—licenses
  License sales
aa) Partner functions—sales area
  Sales partner functions In one embodiment, no credit-side site master data is defined for shops (stores) in the standard case, no copy logic is required for credit-side master data.

Field groups are also provided with reference level "reference shop. The fields in the following maintenance screens or subscreens are copied from the reference shop, assuming one was selected. Otherwise, the data is taken from the department store level.

For general site master data, the following fields are taken:
a) Valuation/inventory management
b) Listing/requirements planning
  Listing
  Requirements planning
c) Purchasing/distribution
  With exception of the supply region, which is copied from the department store
d) Layout/blocks
  Layout data
e) Material groups The assignment of supplying sites at the material group level is not copied by default, because there is no way to ensure that the supplying site of the reference shop and the supplying site for the new shop are identical for the involved material group. In one embodiment, a user exit must be provided here to enable user-specific logic.

The debit-side site master data includes:
a) Environment—Additional user data (central)
  Freely definable attributes
  For condition determination and pricing
b) Marketing
  Key performance indicators
c) Sales—sales area
  Agency business
d) Sales—sales area—product attributes Since no credit-side site master data is defined for shops (stores) in the standard case, no copy logic is required for credit-side master data.

Furthermore, shop-specific fields are provided. Shop-specific maintenance of the following fields must be possible immediately when creating a new shop, either because no default value can be derived from the department store or a reference shop, or a shop-specific value has to be entered.

For general site master data the following fields are included:
a) Address
  Street address: room and floor
  Communication: phone extensions (phone and fax)
b) Layout/blocks
  Layout data: Selling area (including unit of measurement)
c) Opening times
  Opening/closing: Opening date (should be possible to enter in the header area for dialog maintenance and then used as the default value for all shops)

Debit-side site master data includes:
a) Environment—Additional user data (central)
  Freely definable attributes
  For condition determination and pricing
b) Marketing
  Key performance indicators
c) Contact persons
  SD contact persons
d) Contact persons—sales call times
e) Contact persons—details
  Header data
  Person
  Communication
  Company
f) Sales—sales area
  Pricing
  Agency Business Again, because no credit-side site master data is defined for shops (stores) in the standard case, no copy logic is required for credit-side master data.

Closing a shop initiates a multilevel process chain, during which several temporally independent processing steps are run. In one embodiment, closing a shop starts with the entry of a closing date for the shop and setting certain block statuses that restrict the operational use of the shop in procurement and sales processes, follow-on processing includes delisting the articles that are managed in the shop's assortments and ultimately archiving the shop. When all the shops of a department store have been closed, the department store itself can be closed.

In one embodiment, the initiation of the closing process will be simplified: a new maintenance dialog will make it possible to enter the closing date and set a blocked status— including validity periods for the blocks—for several shops at the same time. The date and the blocked status are entered once for all the selected shops and can be adjusted for individual shops subsequently as required.

In another embodiment, if shops have to be blocked temporarily, due to renovation work, for example, a blocking reason can also be entered without a closing date in the maintenance dialog. The shops to be closed can be selected from a department store or, alternatively, a category. The shops to be closed are then selected from the total set of shops displayed.

The subsequent processes then have to be triggered individually for the individual shops, because the flow control sequence can differ from shop to shop. A shop that has low stocks, for example, can delist articles much more quickly than a shop that still has full shelves and has to start a clearance sale first.

Alternatively, the standard transaction for site master maintenance can also be used to block or close the individual shop. The standard transaction must be used to close a department store. The temporary blocking of a department store is also possible in this transaction, but is not very likely in practice. If a department store does have to be blocked, the system has to ensure that the block does not go into effect until all the shops in the department store are also blocked. A corresponding check in site master maintenance will be required to do this.

When a new shop is created, the material group assignments are copied from the optional reference shop, which means manual assignment of the material groups is not necessary. In some cases, however, it may be necessary to add more material groups subsequently. A standard maintenance function is available for this purpose, "Mass Maintenance: Material Group/Store", which can be used to assign multiple material groups to multiple stores. In one embodiment, the following standard selection procedures are available for selecting the sites (worklist) that will be assigned the new material group(s):

Selection of individual sites
Selection of sites in a distribution chain
Selection of sites in a site group Alternatively, the site master maintenance transaction can also be used to change the material group assignments of a single shop.

When a new shop is created, the supplying sites and supply region of the department store are copied, which means manual assignment is not necessary. In some cases, it may become necessary to change the supply relationship or regional assignment of a large number of stores. The affected shops can be selected by department store, category, or supply region. Alternatively, the site master maintenance transaction can also be used to change the supplying sites/delivery region of a single shop.

As noted above, embodiments within the scope of the present invention include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM or other optical disk storage, magnetic disk storage or other magnetic storage devices, or any other medium which can be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above are also to be included within the scope of computer-readable media. Computer-executable instructions comprise, for example, instructions and data which cause a general purpose computer, special purpose computer, or special purpose processing device to perform a certain function or group of functions.

In some embodiments, the present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

The present invention in some embodiments, may be operated in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

It is important to note that the above-described preferred and alternative embodiments of the present invention are illustrative only. Although the invention has been described in conjunction with specific embodiments thereof, those skilled in the art will appreciate that numerous modifications are possible without materially departing from the novel teachings and advantages of the subject matter described herein. For example, although the stores in FIG. 8 above are illustrated and described as being linked directly to the assortments, the assignment could be via assortment versions as with the products. Similarly, the assortment versions used for linking the products to the assortments could be eliminated and instead the products linked directly to the assortments. As another example, the articles described in the foregoing exemplary embodiments could be pre-packed articles that comprise standard collections of sizes and/or colors or other variants of each article. Accordingly, these and all other such modifications are intended to be included within the scope of the present invention. Other substitutions, modifications, changes and omissions may be made in the design, operating conditions and arrangement of the preferred and other exemplary embodiments without departing from the spirit of the present invention.

What is claimed is:

1. A nontransitory computer-readable storage medium storing a program product for defining an enterprise organization in an operative execution system, the program product comprising machine-readable program code for causing, when executed, one or more machines to perform the following method steps:

receiving a designation of a store being a department store;

receiving a designation of a first shop having a first business type, the first business type being based on products sold at the first shop and a first capacity;

receiving a designation of a second shop having a second business type, the second business type being based on products sold at the first shop and a second capacity;

generating a first shop assortment plan based on generating a link between a first node that belongs to a hierarchical assortment planning system and the first shop, the link is established to create a restriction on types of products that are assignable to the first shop, the first shop assortment plan being further based on a determination of products that are impermissible to assign to the first shop based on a lack of a link between the first shop and the impermissible products;

generating a second shop assortment plan based on a second level type and the second capacity, the second shop assortment plan being further based on a determination of products that are impermissible to assign to the second shop;

assigning the first shop assortment plan and the second shop assortment plan to a department store assortment plan; and assigning a group of articles to the department store assortment plan wherein the group of articles are assignable to the first shop and the second shop;

wherein the first shop and the second shop belong to the department store within the same building.

2. The nontransitory computer-readable storage medium of claim 1, wherein the method steps further comprise performing retail operations, including the sales transactions at a shop level.

3. The nontransitory computer-readable storage medium of claim 2, wherein retail processes performed at each shop are determined by a type assigned to each shop.

4. The nontransitory computer-readable storage medium of claim 1, wherein the method steps further comprise reporting at a department store level or a shop level.

5. The nontransitory computer-readable storage medium of claim 1, wherein the method steps further comprise facilitating a stock placement of a good in at least two shops within the same department store.

6. The nontransitory computer-readable storage medium of claim 1, wherein the method steps further comprise generating shop data associated with the department store.

7. The computer-readable storage medium of claim 1, wherein the method steps further comprise generating shop data associated with a reference shop.

8. The nontransitory computer-readable storage medium of claim 1, wherein the first node represents a product type that includes a plurality of sub-nodes of the first node.

9. The nontransitory computer-readable storage medium of claim 1, wherein the assortment planning system may include a second node that is unincluded in the link between the first node and the first shop.

10. The nontransitory computer-readable storage medium of claim 1, wherein products that are part of the second node are impermissible to assign to the first shop.

11. The nontransitory computer-readable storage medium of claim 1, further comprising determining products that are assignable to the first shop based on the products that belong to the first node.

12. A computerized store organization system for defining the organization of stores within an enterprise, comprising:

a computing device configured to organize a plurality of stores;

wherein a first shop is assigned to a department store, wherein the first shop has a first business type, the first business type being based on products sold at the first shop and a first capacity, wherein a second shop is assigned to the department store, wherein the second shop has a second business type, the second business type being based on products sold at the first shop and a second capacity, the computing device configured to generate a first shop assortment plan based on generating a link between a first node that belongs to a hierarchical assortment planning system and a first shop, the link is established to create a restriction on types of products that are assignable to the first shop, the first shop assortment plan being further based on a determination of products that are impermissible to assign to the first shop based on a lack of a link between the first shop and the impermissible products, the computing device further configured to generate a second shop assortment plan based on a second level type and the second capacity, the second shop assortment plan being further based on a determination of products that are impermissible to assign to the second shop, wherein the first shop assortment plan and the second shop assortment plan are assigned to a department store assortment plan, wherein a group of articles are assigned to the department store assortment plan, and wherein the group of articles are assignable to the first shop and the second shop when the group of articles are assigned to the department store assortment plan; and wherein the first shop and the second shop belong to the department store within the same building.

13. The computerized system of claim 12, wherein retail operations, including the sales transactions, are performed at a shop level.

14. The computerized system of claim 13, wherein retail processes performed at each shop are determined by a type assigned to each shop.

15. The computerized system of claim 12, wherein the computing device is configured to report at a department store level or a shop level.

16. The computerized system of claim 12, wherein the computing device is configured to facilitate a stock placement of a good in at least two shops within the same department store.

17. The computerized system of claim 12, wherein the computing device is configured to generate shop data associated with an organizational unit selected from the group consisting of the department store, a reference shop, or combinations thereof.

18. The computerized system of claim 12, wherein the at least one shop may be designated as closed with regards to performing the sales transactions.

* * * * *

UNITED STATES PATENT AND TRADEMARK OFFICE
CERTIFICATE OF CORRECTION

PATENT NO. : 8,620,722 B2
APPLICATION NO. : 11/073038
DATED : December 31, 2013
INVENTOR(S) : Björn Kettner, Cornelia Behrendt-Schinke and Jörg Haupenthal It is certified that error appears in the above-identified patent and that said Letters Patent is hereby corrected as shown below:

In the Claims:

In Column 26, Line 14, the word "nontransitory" should be inserted into claim 7 as follows:

7. The --nontransitory-- computer-readable storage medium of claim 1, wherein the method steps further comprise generating shop data associated with a reference shop.

Signed and Sealed this
Thirteenth Day of May, 2014

Michelle K. Lee
*Deputy Director of the United States Patent and Trademark Office*